(12) United States Patent
Yang et al.

(10) Patent No.: US 11,849,439 B2
(45) Date of Patent: Dec. 19, 2023

(54) BANDWIDTH PART SWITCH FOR SIDELINK COMMUNICATION

(71) Applicant: QUALCOMM Incorporated, San Diego, CA (US)

(72) Inventors: Wei Yang, San Diego, CA (US); Seyedkianoush Hosseini, San Diego, CA (US); Linhai He, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/462,960

(22) Filed: Aug. 31, 2021

(65) Prior Publication Data

US 2022/0116946 A1    Apr. 14, 2022

Related U.S. Application Data

(60) Provisional application No. 63/090,157, filed on Oct. 9, 2020.

(51) Int. Cl.
*H04W 72/0453* (2023.01)
*H04L 5/00* (2006.01)
*H04W 76/34* (2018.01)
*H04L 1/1812* (2023.01)
*H04W 72/20* (2023.01)

(52) U.S. Cl.
CPC ....... *H04W 72/0453* (2013.01); *H04L 1/1812* (2013.01); *H04L 5/0098* (2013.01); *H04W 72/20* (2023.01); *H04W 76/34* (2018.02)

(58) Field of Classification Search
None
See application file for complete search history.

(56) References Cited

U.S. PATENT DOCUMENTS

| | | | |
|---|---|---|---|
| 2020/0288434 A1* | 9/2020 | Choi | H04L 5/0091 |
| 2020/0351067 A1* | 11/2020 | Hui | H04W 72/23 |
| 2022/0015103 A1* | 1/2022 | Peng | H04W 4/40 |
| 2022/0360421 A1* | 11/2022 | Liang | H04L 5/0098 |
| 2022/0394702 A1* | 12/2022 | Lee | H04L 1/1812 |
| 2022/0416976 A1* | 12/2022 | Baek | H04W 72/51 |

* cited by examiner

*Primary Examiner* — Saumit Shah
(74) *Attorney, Agent, or Firm* — Procopio, Cory, Hargreaves & Savitch LLP

(57) ABSTRACT

A sidelink device switches from a first bandwidth part (BWP) for sidelink communication to a second BWP for the sidelink communication and suspends, releases, or continues to use one or more reserved resources in the first BWP based on the switch from the first BWP to the second BWP for the sidelink communication.

30 Claims, 15 Drawing Sheets

BANDWIDTH PART SWITCH FOR SIDELINK COMMUNICATION

CROSS REFERENCE TO RELATED APPLICATION(S)

This application claims the benefit of and priority to U.S. Provisional Application Ser. No. 63/090,157, entitled "Bandwidth Part Switch for Sidelink Communication" and filed on Oct. 9, 2020, which is expressly incorporated by reference herein in its entirety.

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a sidelink device. The apparatus switches from a first bandwidth part (BWP) for sidelink communication to a second BWP for the sidelink communication and suspends, releases, or continues to use one or more reserved resources in the first BWP based on the switch from the first BWP to the second BWP for the sidelink communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
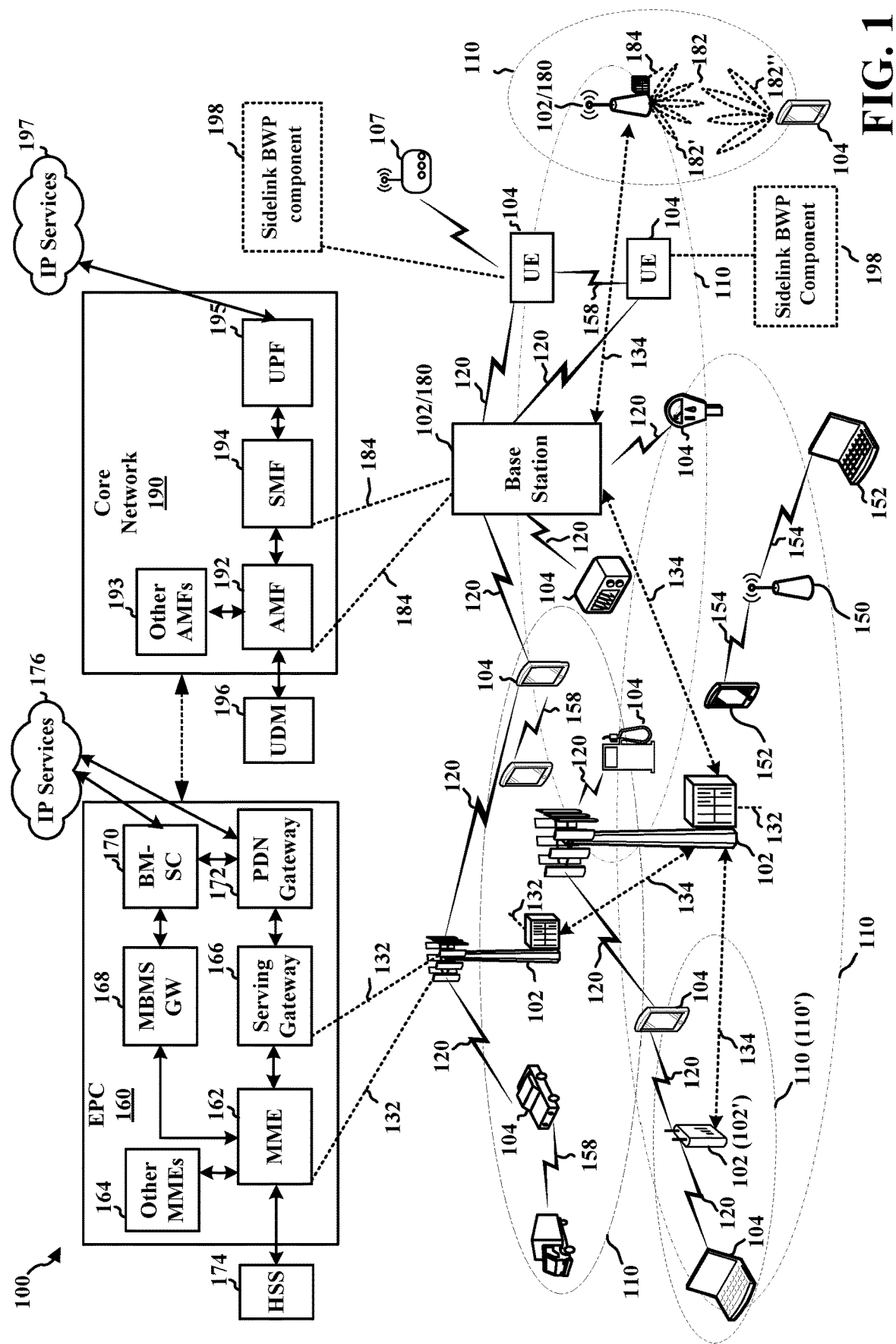
FIG. 1 is a diagram illustrating an example of a wireless communications system and an access network.

The use of a bandwidth part (BWP) that includes a subset of contiguous resource blocks within a frequency range of a carrier may enable a UE to achieve power savings. Sidelink communication that occurs directly between UEs may include unique challenges to avoid interference that are different than communication between a UE and a base station. Sidelink communication may include a single BWP for a sidelink carrier, e.g., which may help to avoid interference among sidelink transmissions. However, a single BWP constrains an ability to provide power savings through communication over narrower bandwidths. Aspects presented herein provide for the configuration of multiple BWPs in a sidelink carrier with each BWP including one or more resource pools. Aspects further provide for hybrid automatic repeat request (HARD) feedback, retransmission, resource allocation, resource reservation, periodic reservations, and other aspects in connection with a BWP switch for sidelink.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

A UE 104, or other device communicating based on sidelink, may include a sidelink BWP component 198 configured to switch from a first BWP for sidelink communication to a second BWP for the sidelink communication and to determine whether to suspend or release one or more reserved resources in the first BWP for the sidelink communication based on a BWP switch from the first BWP to the second BWP for the sidelink communication. The sidelink BWP component 198 may be configured to suspend, release, or continue to use one or more reserved resources in the first BWP based on the switch from the first BWP to the second BWP for the sidelink communication.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
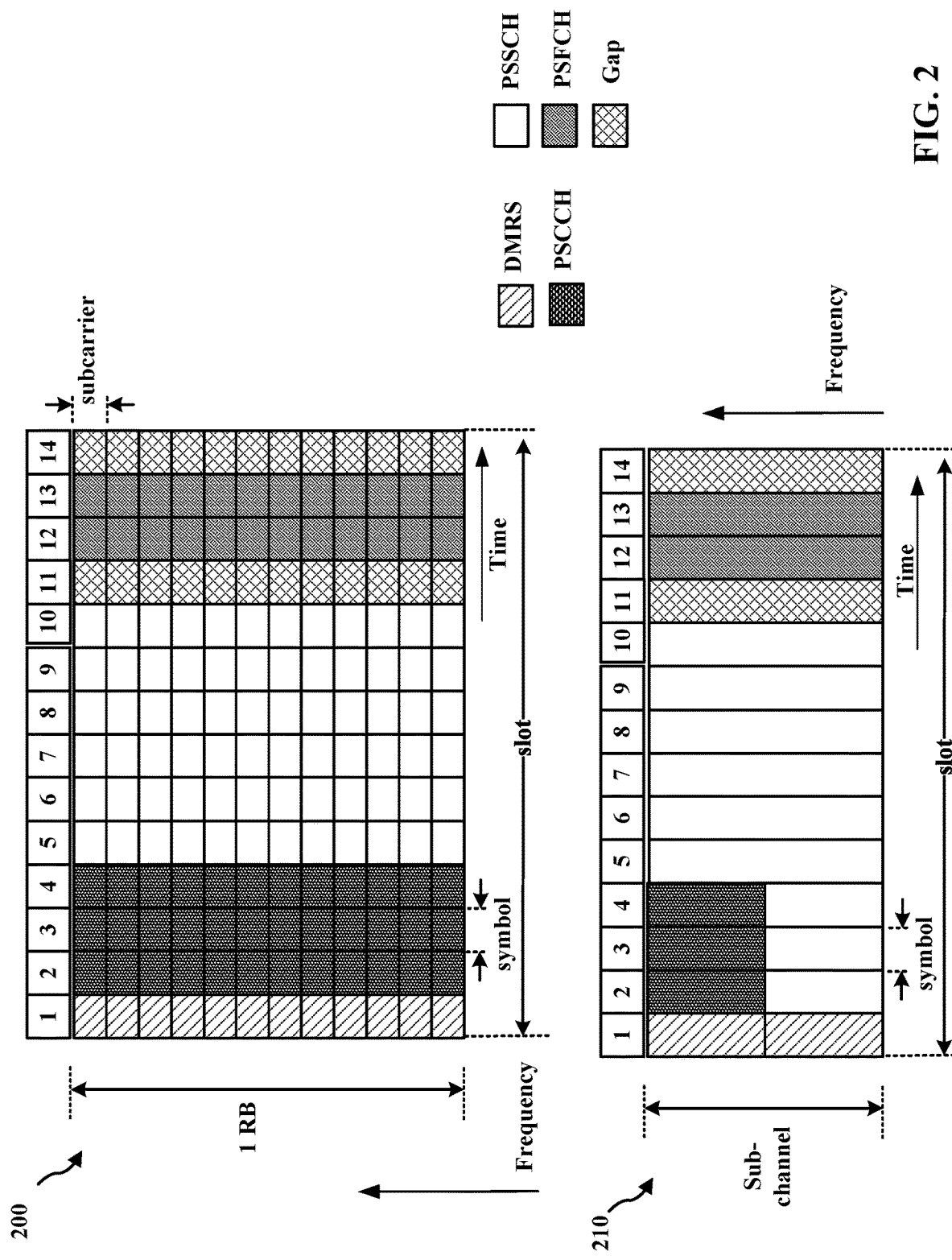
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
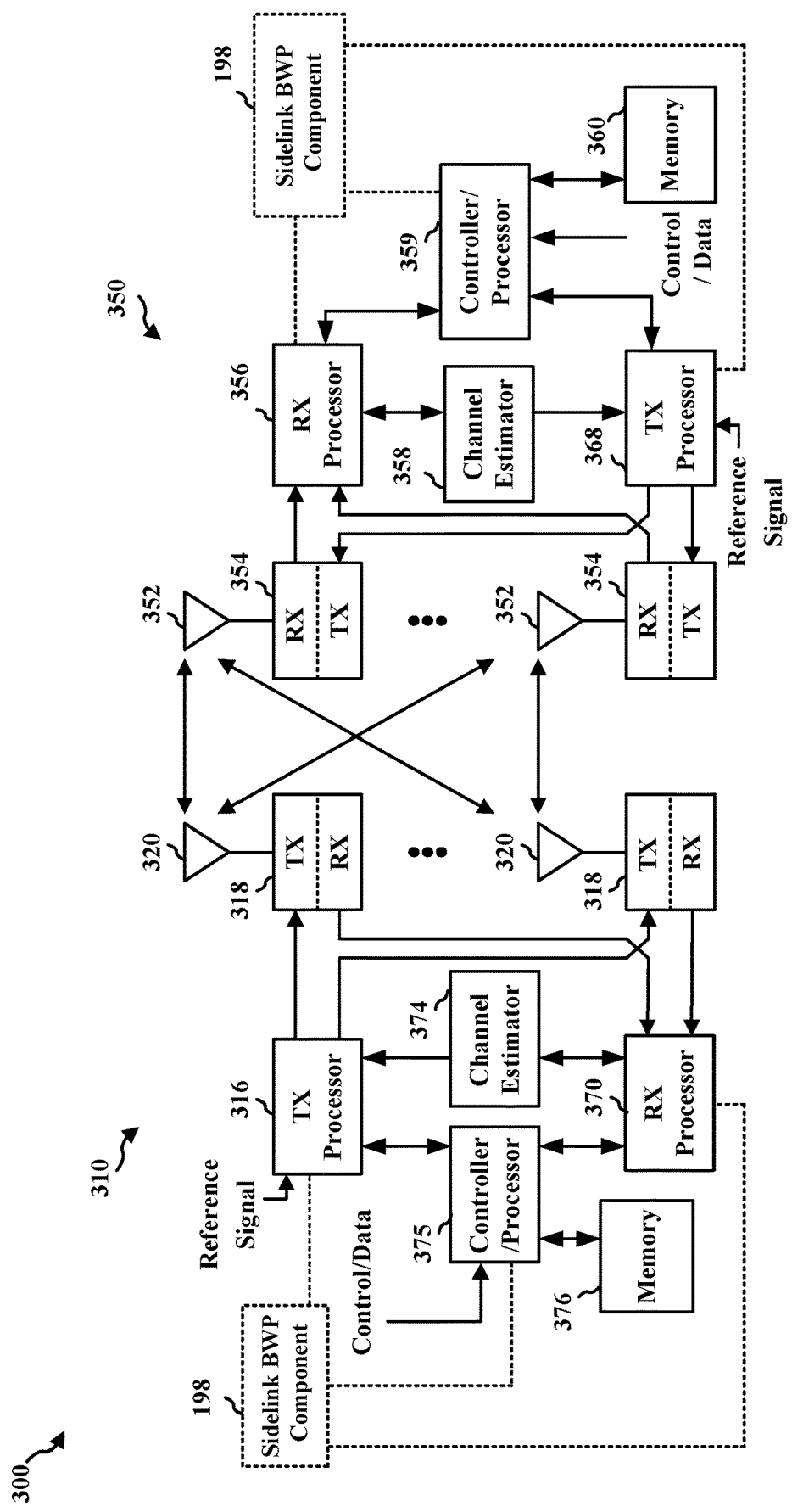
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, the controller/processor 359, the TX processor 316, the RX processor 370, and the controller/processor 375 may include a sidelink BWP component 198 that is configured to perform the aspects described in connection with FIG. 1.

Figure 4:
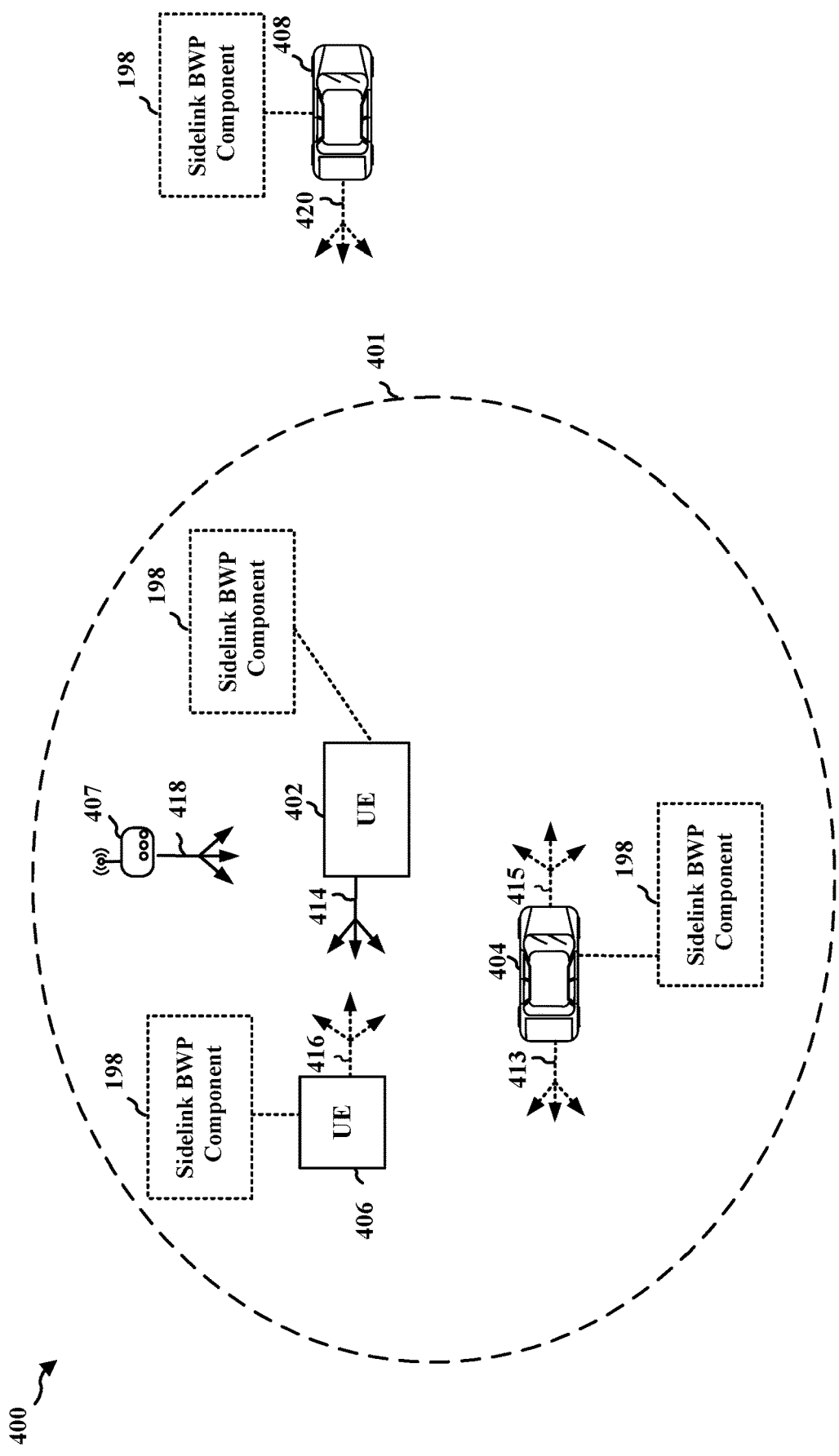
FIG. 4 illustrates an example communication system based on sidelink communication.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit communication 413, 415 intended for receipt by other UEs within a range 401 of UE 404, and UE 406 may transmit communication 416. Additionally/alternatively, RSU 407 may receive communication from and/or transmit communication 418 to UEs 402, 404, 406, 408.

The UE 402 may provide the SCI with information for decoding the corresponding data channel. The SCI may also include information that receiving device may use to avoid interference. For example, the SCI may indicate time and frequency resources that will be occupied by the data transmission, may be indicated in a control message from the transmitting device.

Figure 5:
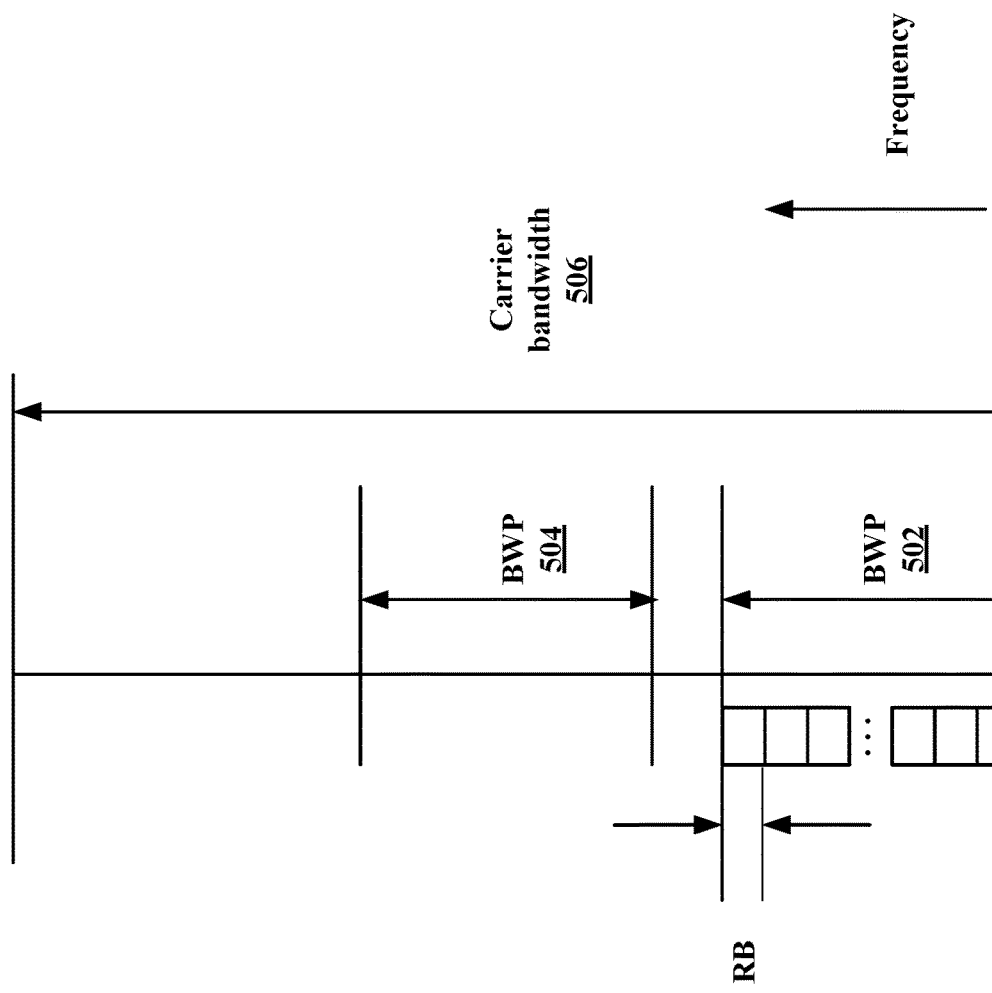
FIG. 5 illustrates an example of frequency resources including multiple BWPs.

In cellular link communication between a base station (e.g., the base station 102 or 180) and a UE (e.g., the UE 104) over a Uu link, the UE may achieve power savings through the use of a configured bandwidth part (BWP) that includes a frequency range that is a portion of a carrier bandwidth. FIG. 5 illustrates an example frequency diagram 500 showing multiple BWPs (e.g., 502 and 504) within a carrier bandwidth 506. Each BWP includes a set of contiguous physical RBs. The active BWP(s) of the UE may change dynamically over time, e.g., depending on a traffic pattern between the UE and the base station. The use of the BWPs may enable a UE to communicate with the base station over a narrower bandwidth, which may use less power at the UE.

Figure 6:
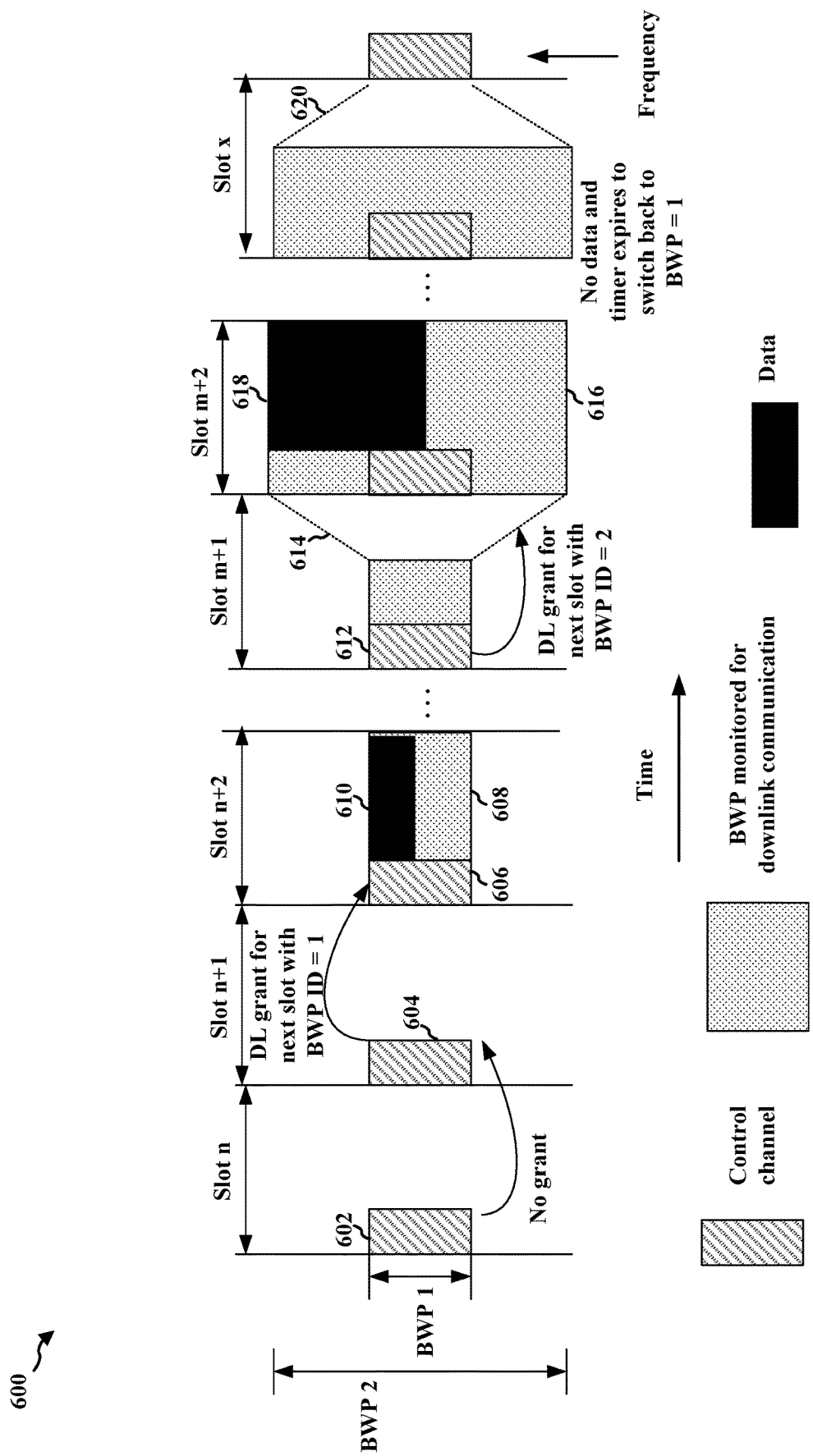
FIG. 6 illustrates example aspects of BWP switching for Uu based communication between a base station and a UE.

FIG. 6 illustrates an example of BWP switching 600 for downlink reception by a UE. The UE may monitor a narrower BWP (e.g., BWP 1) for a control channel transmission 602 from the base station. The control channel 602 does not include a downlink grant for the UE. At a next slot, the UE may receive a downlink grant in the control channel 604, the downlink grant indicating BWP 1. Thus, the UE continues to monitor the narrower bandwidth 608 of BWP 1. The UE may receive a control channel transmission 606 and/or data 610 within the frequency resources of the BWP 1. In another slot, the UE may receive a downlink grant in a control channel transmission 612 that indicates a different BWP, e.g., BWP 2. As illustrated at 614, the UE switches to monitor the indicated BWP, as shown at 616. The UE receives the downlink data 618 on frequency resources of BWP 2. The UE may switch back to monitoring the narrower bandwidth of BWP 1. For example, if the UE has not received data and a timer expires, the UE may switch, at 620, back to monitoring BWP 1.

Figure 7:
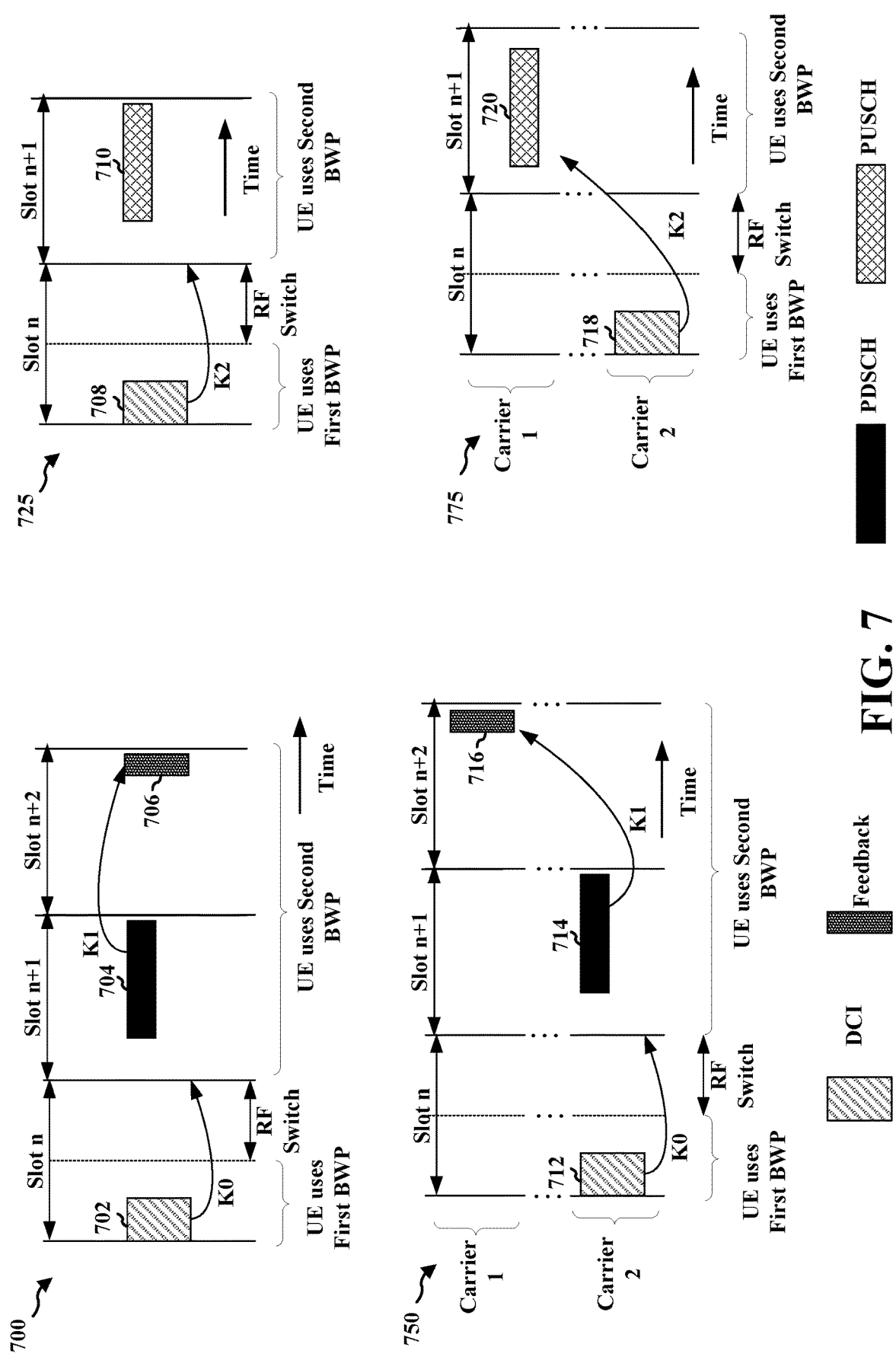
FIG. 7 illustrates example aspects of time division duplex (TDD) BWP switching and frequency division duplex (FDD) BWP switching.

FIG. 7 illustrates examples of BWP switching for downlink and uplink transmissions from a UE. In a downlink TDD example, a UE receives downlink control information (DCI) 702 in a first BWP with a downlink grant for the UE to receive PDSCH 704 in a second BWP. The UE performs a BWP switch from the first BWP to the second BWP in order to receive the PDSCH. The UE then transmits feedback 706 (e.g., ACK/NACK) in the second BWP. The RF switching latency for the UE to switch from the first BWP to the second BWP may be provided for with a delay parameter (e.g., k0) between the DCI and the PDSCH reception. K1 may provide a delay between the PDSCH reception and the feedback 706. In a downlink FDD example 750, a UE receives DCI 712 in a first BWP of a first carrier with a downlink grant for the UE to receive PDSCH 714 in a second BWP of the first carrier. The UE performs a BWP switch from the first BWP to the second BWP for the first carrier in order to receive the PDSCH. The UE then transmits feedback 716 in a different carrier. Similar to the TDD example 700, a delay parameter (e.g., k0) may be configured for a delay between the DCI and the PDSCH reception due to the RF switching latency for the UE to switch from the first BWP to the second BWP. In the examples 700 and 750, the PDSCH may be in the new BWP, e.g., involving a BWP switch from the BWP in which the DCI with the downlink grant is received. In the TDD example 700, the UE may apply a new DL/UL BWP pair, e.g., transmitting the ACK (e.g., feedback 706) in a new uplink BWP. In the FDD example 750, the UE may receive the PDSCH 714 in the new BWP, and may transmit the feedback 716 in a prior uplink BWP.

In the uplink TDD example 725, the UE receives the DCI 708, in a first BWP, with an uplink grant for the UE to transmit the PUSCH 710 in a second BWP. The UE performs a BWP switch from the first BWP to the second BWP in order to transmit the PUSCH. The RF switching latency for the UE to switch from the first BWP to the second BWP may be accommodated by a delay parameter (e.g., k2) for a delay between the DCI and the PUSCH transmission. In the uplink FDD example 775, the UE may be configured for a first BWP for a first carrier. The UE receives the DCI 718, on a second carrier, with an uplink grant for the UE to transmit PUSCH 720 in a second BWP of the first carrier. The UE performs a BWP switch from the first BWP to the second BWP for the first carrier in order to transmit the PUSCH. The RF switching latency for the UE to switch from the first BWP to the second BWP on the first carrier may be accommodated with a delay parameter (e.g., k2) that corresponds to a delay between the DCI and the PUSCH transmission. In the examples 725 and 775, the PUSCH may be transmitted in the new BWP, e.g., involving a BWP switch from the BWP in which the DCI with the uplink grant is received. As illustrated in the FDD examples 750 and 775, the UL and DL BWP may be switched independently.

The size of the DCI in different BWPs may be different due to the different bandwidth sizes of the BWPs. In some examples, a DCI in one BWP may indicate a grant in a different BWP, e.g., which may provide for different bandwidths for the control channel with the grant and the data based on the grant.

Figure 8:
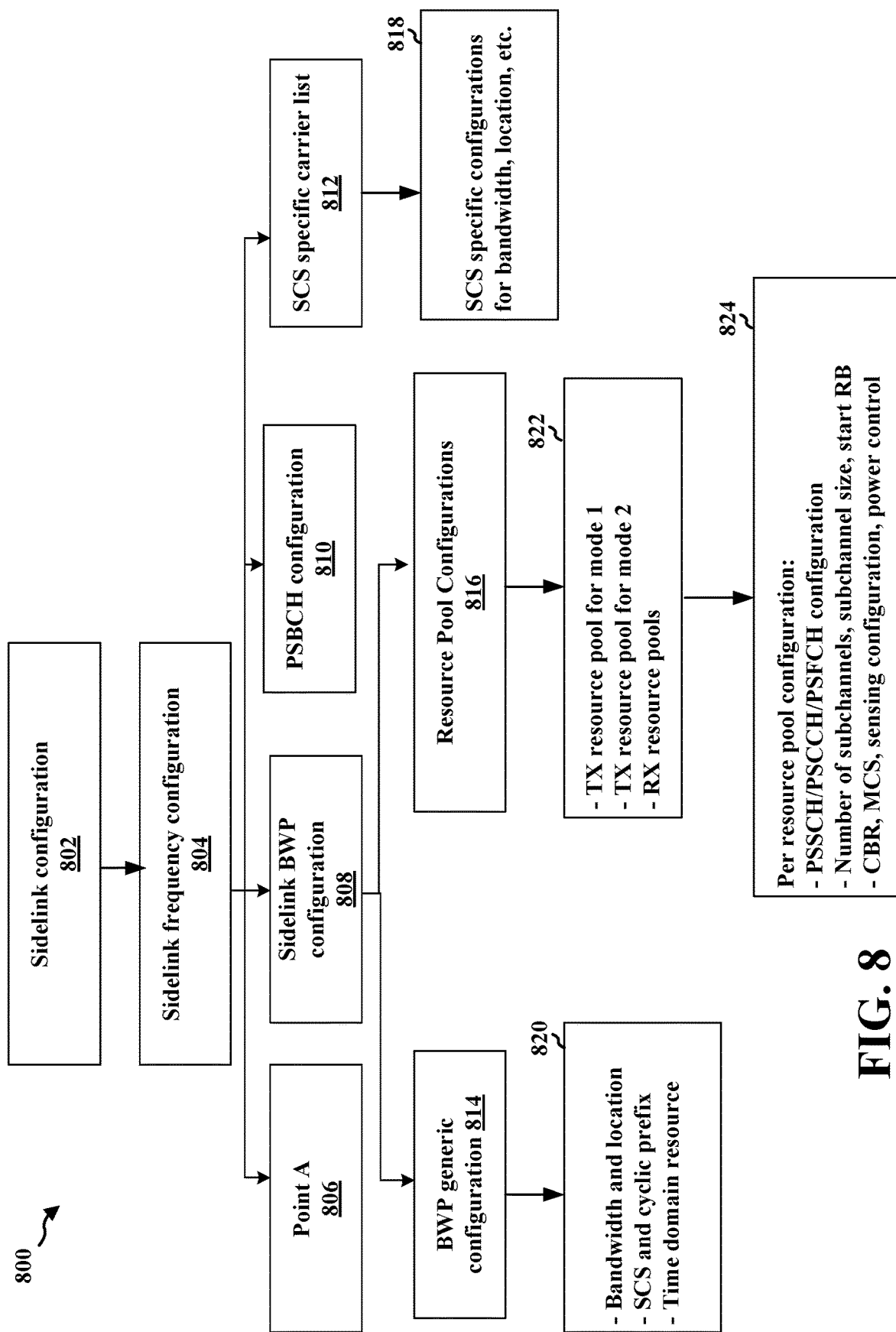
FIG. 8 illustrates an example hierarchy structure for a sidelink configuration include a sidelink BWP configuration.

In some examples, a single BWP may be configured within a sidelink carrier. FIG. 8 illustrates an example hierarchy for a configuration for sidelink communication 800 including a BWP configuration 808. As illustrated in FIG. 8, a sidelink configuration 802 may include a sidelink frequency configuration 804, among other aspects. The sidelink frequency configuration 804 may have aspects that correspond to a carrier configuration in Uu based communication. The sidelink frequency configuration 804 may include a reference point, e.g., point A 806, a physical sidelink broadcast channel (PSBCH) configuration 810, and/or a subcarrier spacing (SCS) specific carrier list 812. The SCS specific carrier list 812 may include SCS specific configurations 818 for bandwidth, location, etc. The sidelink frequency configuration 804 may include a sidelink BWP configuration 808. The BWP configuration 808 may include a generic BWP configuration 814. The generic BWP configuration 814 may include one or more parameters 820 such as a bandwidth and frequency location for the generic BWP, an SCS and cyclic prefix (CP) for the generic BWP, and/or one or more time domain resources for the generic BWP. The sidelink BWP configuration 808 may include one or more resource pool configurations 816. Each resource pool configuration may include one or more resource pools 822 for sidelink communication. A BWP may be wider in the frequency domain than a resource pool, and one BWP may include multiple receiving and transmitting resource pools. For example, FIG. 8 illustrates two transmission resource pools and at least one reception resource pool. As an example, different transmission pools may be configured for different modes of resource allocation. For example, at least one transmission resource pool may be configured for centralized resource allocation (e.g., mode 1 resource allocation in which a base station or other central entity allocates resources to various UEs for sidelink communication). At least one transmission resource pool may be configured for decentralized resource allocation (e.g., mode 2 resource allocation or sensing based resource allocation in which each UE determines its own transmission resources from the resource pool). The resource pools 822 may further include one or more reception resource pools. Each resource pool may include a resource pool configuration 824 that includes a configuration of one or more of a PSSCH, PSCCH, or PSFCH. Each resource pool configuration 824 may include a number of subchannels, subchannel size, starting RB, a code block rate (CBR), modulation and coding scheme (MCS), sensing configuration (e.g., for mode 2 resource allocation), and/or power control configuration, among others. In some examples, reach resource pool configuration may include a maximum number of reception pools and/or transmission pools. For example, a sidelink BWP may include a maximum of 16 reception pools and a maximum of 8 transmission pools.

Aspects presented herein provide for multiple BWPs to be configured for a single sidelink carrier. The BWPs may improve power savings at a sidelink device while also providing different frequency resources for different sidelink communication.

Similar to the BWPs for a UU link, having multiple BWPs for a sidelink carrier may enable some sidelink devices to communicate over a narrower bandwidth, which may improve power savings at the sidelink devices. However, sidelink devices that communicate based on overlapping BWPs may cause interference to each other. Aspects presented herein provide for improved coordination of sidelink communication that is based on multiple BWPs.

Figure 9:
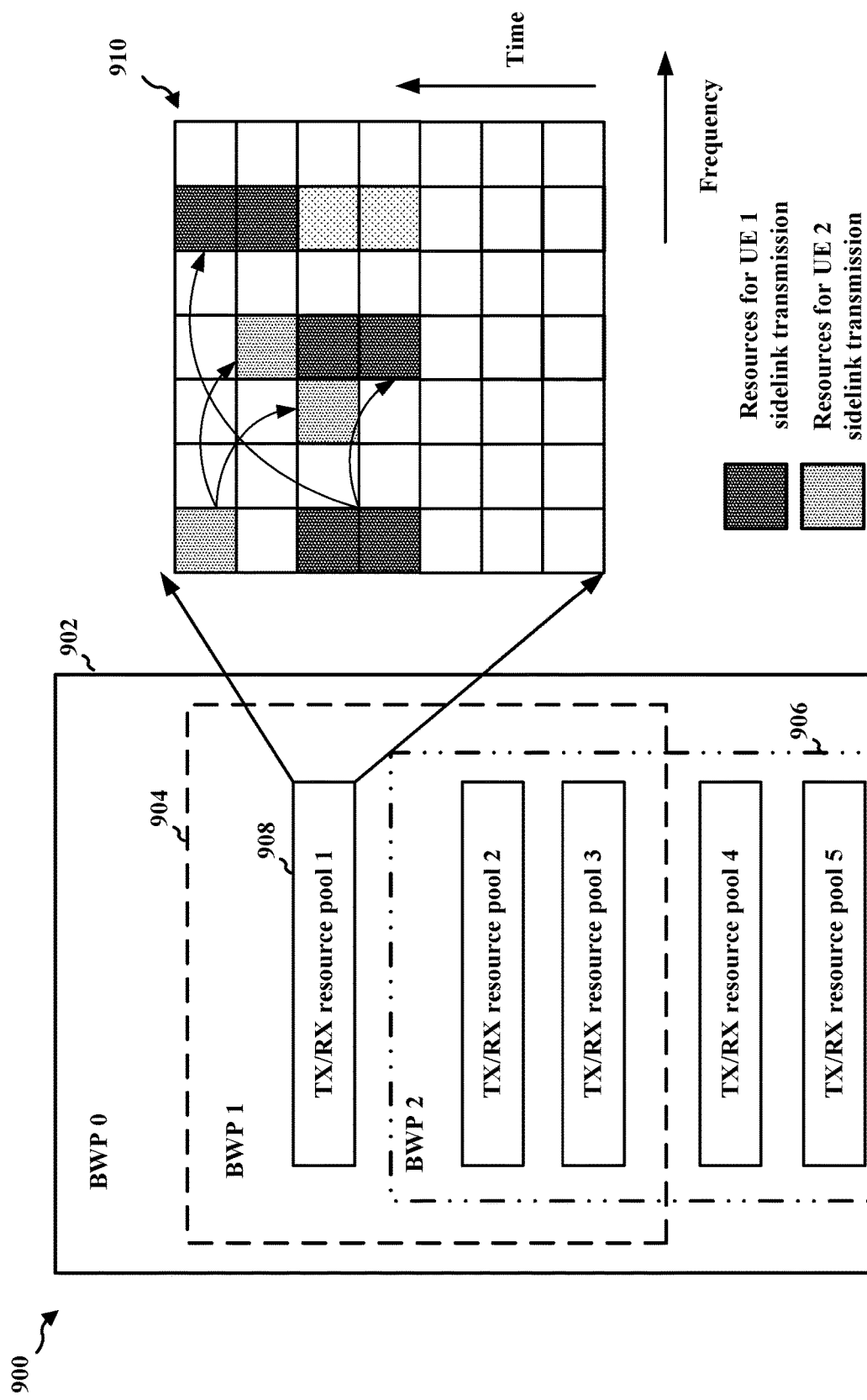
FIG. 9 is an example of BWP configurations for sidelink communication.

FIG. 9 illustrates an example of a plurality of BWPs 900 configured for a sidelink carrier. A UE may be configured with multiple BWPs in a sidelink carrier. Each BWP may contain one or more resource pools. FIG. 9 illustrates BWP 0 902 that may include each resource pool of the sidelink carrier. BWP 1 904 includes transmission/reception resource pool 1, transmission/reception resource pool 2, and transmission/reception resource pool 3. BWP 2 906 includes transmission/reception resource pool 2, transmission/reception resource pool 3, transmission/reception resource pool 4, and transmission/reception resource pool 5. A resource pool may be shared between two or more BWPs (e.g., transmission/reception resource pools 2 and 3 in FIG. 9 are shared between BWP 0, BWP 1, and BWP 2).

Communication between sidelink UEs may occur within the resource pools of an active BWP for the UEs, e.g., and may not occur outside of the resource pools of the active BWP. For example, if BWP 1 is the active BWP for a UE, the UE may exchange sidelink communication within transmission resource pools 1, 2, or 3 and may not transmit or receive sidelink communication in transmission resource pool 4 or 5.

Each resource pool for sidelink communication may include a pool of time and frequency resources 910, such as illustrated for transmission/reception resource pool 1 908.

For UEs using resource allocation mode 2 (e.g., the decentralized resource allocation or sensing based resource allocation), sensing, resource reservation, PSFCH transmission (e.g., resource mapping between PSSCH and PSFCH), congestion control, and/or CSI feedback may be performed within each resource pool. In some examples, there may be no cross-resource pool scheduling. As described in connection with FIG. 8, each transmission resource pool may have configurations 824. SCI transmissions may be constructed separately in each resource pool based on the corresponding PSSCH/PSCCH/PSFCH configurations.

A UE may switch between BWPs for sidelink communication, e.g., a switch from BWP 1 to BWP 2 or from BWP 0 to BWP 1. For example, a UE may decide to switch to a different BWP based on a traffic load. If a UE has a large portion of traffic (e.g., that meets a threshold) arriving at a transmit queue, the UE may determine to switch to a BWP with a larger bandwidth. The UE may indicate the change to the receiving device(s). As another example, if the UE's traffic reduces or finishes, the UE may switch to a narrower BWP. Aspects presented herein enable a sidelink device to handle sidelink resource pool switches in connection with such a BWP switch.

A UE may transmit or receive sidelink communication based on periodic resources or aperiodic resources. For example, a UE using resource allocation mode 2 (e.g., which may be referred to as decentralized resource allocation or sensing based resource allocation), the UE may reserve periodic sidelink resources or aperiodic sidelink resources after sensing for resource reservations from other sidelink UEs. The reservation may be for the UE to transmit multiple, sidelink MAC protocol data units (PDUs). For example, a UE may transmit SCI (which may be referred to as an SCI grant) that reserves a resource periodically. The periodic resource may have an indicated period up to a maximum period. An example of a maximum period is 1 second. As another example, the UE may transmit SCI (e.g., an SCI grant) that reserves a one-shot resource (e.g., an aperiodic resource). The aperiodic resource may be reserved in up to 32 slots from the slot of the SCI transmission, for example.

Figure 10:
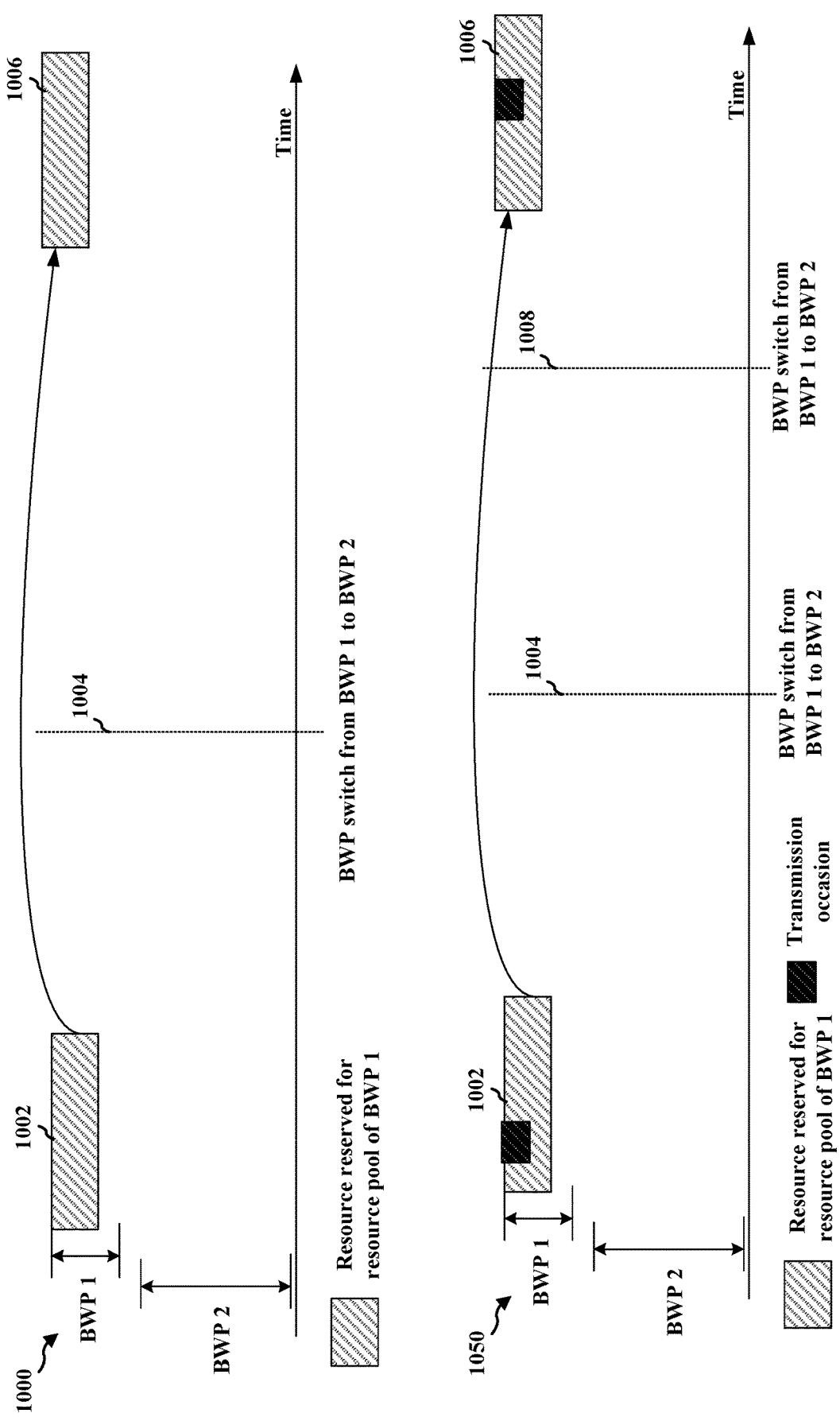
FIG. 10 illustrates examples of sidelink resource allocation based on a BWP switch.

If the UE performs a BWP switch from a current BWP of the sidelink carrier to a different BWP of the sidelink carrier, the UE may determine to release previously reserved resources of the first BWP. By releasing the previously reserved resources, the UE will assume that the resources cannot be used after the UE switches to the second BWP, even if the UE switches back to the first BWP prior to a time of the reserved resource. For example, the UE may re-reserve the resources by sending an additional SCI in order to use the resources after releasing the resources due to the BWP switch. FIG. 10 illustrates an example 1000 showing sidelink resources (e.g., 1002, 1006) reserved by a UE for transmission in a resource pool of a first BWP (BWP 1). The resources may be based on a periodic resource reservation or an aperiodic resource reservation. The UE may transmit sidelink communication on the resource 1002 using resources from a transmission resource pool of BWP 1. At time 1004, the UE switches to a different BWP. If the transmission pool in which the UE reserved the resources is common to BWP 1 and BWP 2 (such as transmission/reception resource pool 2 or 3 in the example in FIG. 9), the UE may continue to transmit sidelink communication using the reserved resource 1006 after the switch to the BWP 2. However, if BWP 2 does not comprise the transmission resource pool corresponding to the reserved resources, such as if the reservation is based on the transmission/reception resource pool 908 in FIG. 9, the UE may release the reserved resources for the resource pool of the first BWP. For example, if the resource pool is not comprised in the second BWP to which the UE is switching, the resource pool may be considered deactivated based on the BWP switch, and the UE may release all reserved resources (whether aperiodic or periodic) in the resource pool of the first BWP.

In some examples, the UE may use the previously reserved resources of a first BWP after switching to a second BWP and switching back to the first BWP, e.g., if the UE switches back to the first BWP prior to the slot containing the reserved resource. FIG. 10 illustrates an example 1050 showing the reserved resources 1002 and 1006 for a transmission resource pool of BWP 1. The resources are reserved prior to the BWP switch at 1004. Similar to the example 1000, the UE switches from BWP 1 to BWP 2 at 1004. In the example 1050, the UE switches back to BWP 1 at 1008, e.g., prior to the reserved resource 1006. Thus, the UE may transmit sidelink communication based on the reserved resource 1006 for the transmission resource pool of BWP 1. In some examples, the UE may use the previously reserved resource (e.g., resource 1006) if the resource is based on a periodic reservation. If the resource is based on an aperiodic reservation, the UE may release the resource upon the BWP switch at 1004, and may refrain from transmitting in the reserved resource 1006 even if the UE switches back to BWP 1 prior to the resource 1006. In some examples, the UE may use the reserved resource 1006 based on a condition that no transmission occasion occurs between the two BWP switching events, e.g., between 1004 and 1008. As illustrated in FIG. 10, the UE does not have a transmission occasion during the time that the UE switched to the BWP 2. Therefore, upon switching back to BWP 1, at 1008, the UE may continue to transmit on the previously reserved resource 1006 (e.g., that is reserved prior to the BWP switch to BWP at 1004). In some examples, the UE may use the previously reserved resources (with BWP switching between the reservation and actual transmission) if the priority of the transmission associated with the reservation is above a threshold. The UE may consider the reservation as being released if the reservation is associated with a priority that is below the threshold. Reservations of a lower priority may be overridden/preempted by another UE's reservation for a higher priority transmission.

In some examples, a base station may provide a UE with a configured grant (CG) that provides a set of periodic resources for transmitting sidelink communication. For example, the UE may receive the configured grant of sidelink resources based on resource allocation mode 1 (e.g., a centralized resource allocation mode). In a first type (e.g., Type 1) of configured grant, the base station may configure the sidelink grant in RRC signaling, and the UE may use the sidelink resources without further activation from the base station. In a second type (e.g., Type 2) of configured grant, the base station may configure one or more sets of periodic resources, e.g., in RRC signaling, and may activate/deactivate a configured set of periodic resources. For example, the base station may transmit downlink control information (DCI) to activate/deactivate periodic resources configured in RRC signaling. In the type 2 configured grant, the UE may use the periodic sidelink resources of the configured grant if the configured grant is activated by the base station.

If a UE performs a BWP switch from a first BWP to a second BWP that includes one or more common resource pools that are common to the first BWP, the common resource pool(s) may not be affected by the BWP switch. If the UE has a configured grant for resources of a common resource pool, the UE may continue to transmit sidelink communication based on the configured grant after the switch to the second BWP.

Figure 11:
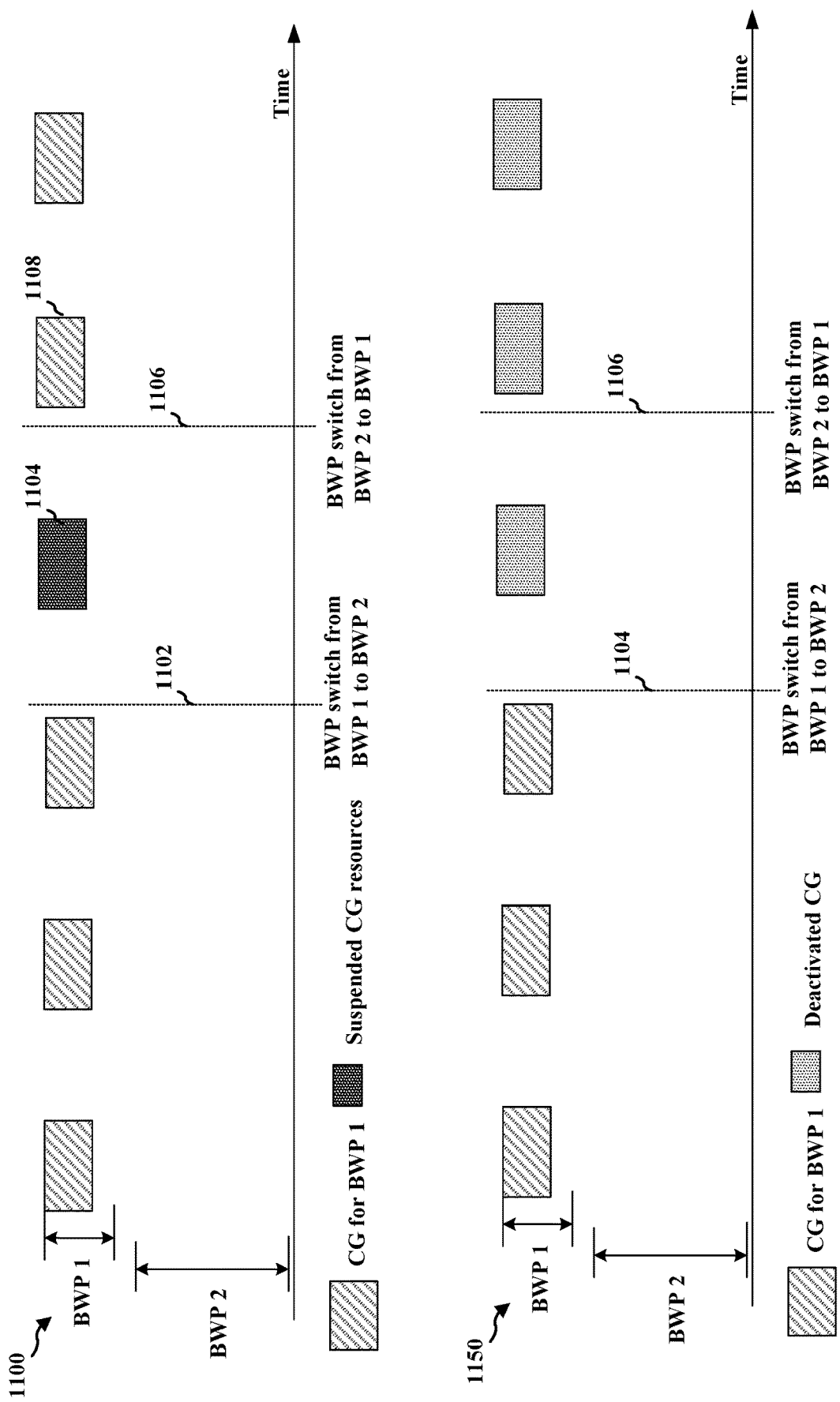
FIG. 11 illustrates examples of sidelink communication based on a configured grant and a BWP switch.

If a configured grant is in a resource pool that is not common to the second BWP and becomes deactivated based on the BWP switch to the BWP 2, the UE may temporarily stop transmissions using the configured grant. For example, the UE may suspend transmissions based on the configured grant or may treat the configured grant as being suspended. FIG. 11 shows a configured grant example 1100. When the UE switches from the BWP 1 to the BWP 2, at 1102, the UE may suspend transmission based on the configured grant, e.g., and may not transmit using the resource 1104. The UE may resume transmissions based on the configured grant if the UE switches back to the BWP 1, e.g., such as at 1106 in FIG. 11. For example, the UE may transmit using the resource 1108 after the BWP switch at 1106. The UE may suspend/resume the use of the configured grant resources based on the configured grant being a Type 1 configured grant that does not involve activation/deactivation by the base station after the RRC configuration.

If a configured and activated configured grant (e.g. a Type 2 configured grant) is in a resource pool that is not common to the second BWP and becomes deactivated based on the BWP switch to the BWP 2, the UE may deactivate the configured grant. Thus, the UE may consider the configured grant to be deactivated, e.g., until the UE receives signaling from the base station activating the configured grant. FIG. 11 illustrates an example 1150 in which the CG is treated as deactivated based on the BWP switch at 1102 even though the UE switches to the BWP 1 at 1106.

Figure 12:
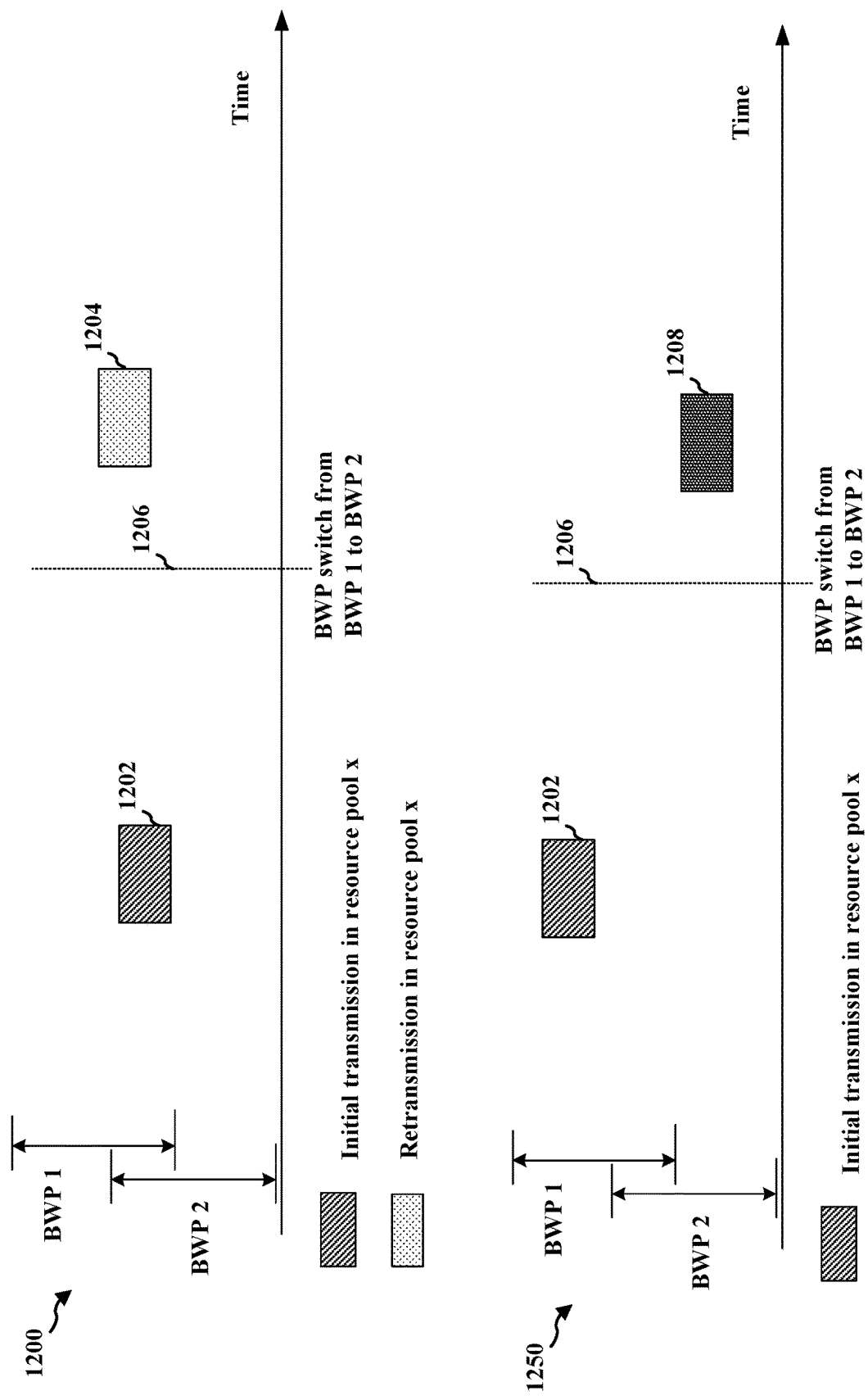
FIG. 12 illustrates an example of HARQ retransmission for sidelink communication after a BWP switch.

If a sidelink transmission is not received correctly, the UE may retransmit the sidelink message. For example, if the transmitting UE receives HARQ feedback (e.g., a NACK) that indicates that an initial sidelink transmission was not received by an intended device, the UE may provide a retransmission of the sidelink transmission. For HARQ, initial transmissions and retransmissions for the same HARQ process may occur within the same resource pool, e.g., and may not occur in different resource pools. If two BWPs contain a common resource pool (e.g., transmission/reception resource pool 2 or 3 that are common to both BWP 1 and BWP 2 in FIG. 9, then a HARQ retransmission may be provided following a switch between the BWPs. FIG. 12 illustrates an example 1200 in which an initial transmission 1202 in resource pool x of BWP 1 is retransmitted at 1204 in resource pool x after the BWP switch to BWP 2 at 1206. The retransmission may be based on the resource pool x being common to both the BWP 1 and BWP 2.

If the two BWPs do not include the common resource pool, the UE may not transmit the HARQ retransmission of the same transport block (TB) in the new BWP.

In some examples, the initial transmission and retransmission may occur in different resource pools/BWPs based on a resource allocation mode for the sidelink transmissions. For example, if both resource pools before and after the BWP switch are mode 1 resource allocations (e.g., centralized resource allocations), the retransmission of a TB may be allowed in a different resource pool than the initial transmission. FIG. 12 illustrates an example 1250 of an initial transmission 1202 of a TB in resource pool x of BWP 1, and a retransmission 1208 of the TB in resource pool y of BWP 2 after the BWP switch 1206. If at least one of the resource pools is configured with resource allocation mode 2 (e.g., decentralized or sensing based resource allocation), then the UE may not transmit the retransmission in a different resource pool than the initial sidelink transmission. For example, the UE may not transmit a retransmission 1208 in resource pool y, but may instead provide another initial transmission of the sidelink message in resource pool y. Thus, the UE may determine whether or not to provide a retransmission of a TB in a different resource pool than an initial sidelink transmission of the TB based on a resource allocation mode associated with the resource pools.

Figure 13:
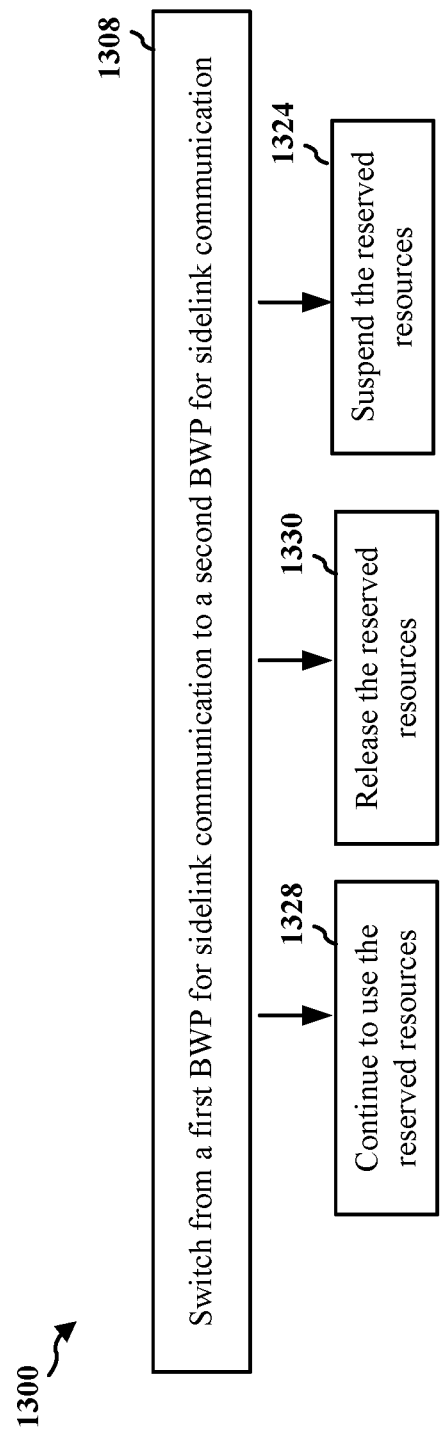
FIG. 13 is a flowchart of a method of wireless communication including sidelink communication with a BWP switch.

FIG. 13 is a flowchart 1300 of a method of wireless communication. The method may be performed by a sidelink device, such as a UE (e.g., the UE 104, the wireless device 310 or 350, the apparatus 1402). The method may enable the use of multiple BWPs for a sidelink carrier. The use of multiple BWPs may enable some sidelink devices to communicate based on a narrower frequency range, which may help the sidelink devices to reduce power consumption.

At 1308, the sidelink device switches from a first BWP for sidelink communication to a second BWP for the sidelink communication. The first BWP and the second BWP may each be configured with one or more sidelink resource pools, e.g., as described in connection with FIG. 9. The switch may be performed, e.g., by the BWP switch component 1540 of the apparatus 1502 in FIG. 15. For example, FIGS. 10-12 illustrate examples of a BWP switch.

The device then suspends, releases, or continues to use the reserved resources in the first BWP based on the switching from the first BWP to the second BWP for the sidelink communication. As illustrated at 1324, the sidelink device may suspend the one or more reserved resources (e.g., of the configured grant) in a resource pool of the first BWP based on a switch from the first BWP to the second BWP. In some aspects, the sidelink device may suspend the reserved resources based on the BWP switch if the configured grant is a type 1 configured grant. Additionally, or alternatively, the sidelink device may suspend the reserved resources if the resource pool is not comprised in the second BWP. The suspension may be performed, e.g., by the sidelink resource component 1542 of the apparatus 1502.

As illustrated at 1328, the sidelink device may continue to use the one or more reserved resources in a resource pool of the first BWP for the sidelink communication. The sidelink device may continue to use the one or more reserved resources based on a periodic reservation. The sidelink device may continue to use the one or more reserved resources based on the one or more reserved resources not having a transmission occasion between the first BWP switch and the second BWP switch. The sidelink device may continue to use the reserved resources after the switch back to the first BWP based on a priority level of a transmission associated with the one or more reserved resources being above a threshold. The UE may consider the one or more reserved resources to be released if the priority of the transmission is below the threshold. The continued use may be performed, e.g., by the sidelink resource component 1542 of the apparatus 1502.

As illustrated at 1330, the sidelink device may release the one or more reserved resources in a resource pool of the first BWP for the sidelink communication based on a switch from the first BWP to the second BWP. As one example, the sidelink device may release the reserved resources in the resource pool of the first BWP if the one or more resources are based on an aperiodic reservation. The sidelink device may release the one or more reserved resources in a resource pool of the first BWP for the sidelink communication if a transmission occasion of the one or more reserved resources occurs between the first BWP switch and the second BWP switch. The release may be performed, e.g., by the sidelink resource component 1542 of the apparatus 1502. In some aspects, the sidelink device may release the reserved resources in the resource pool of the first BWP if the resource pool is not comprised in the second BWP.

Figure 14:
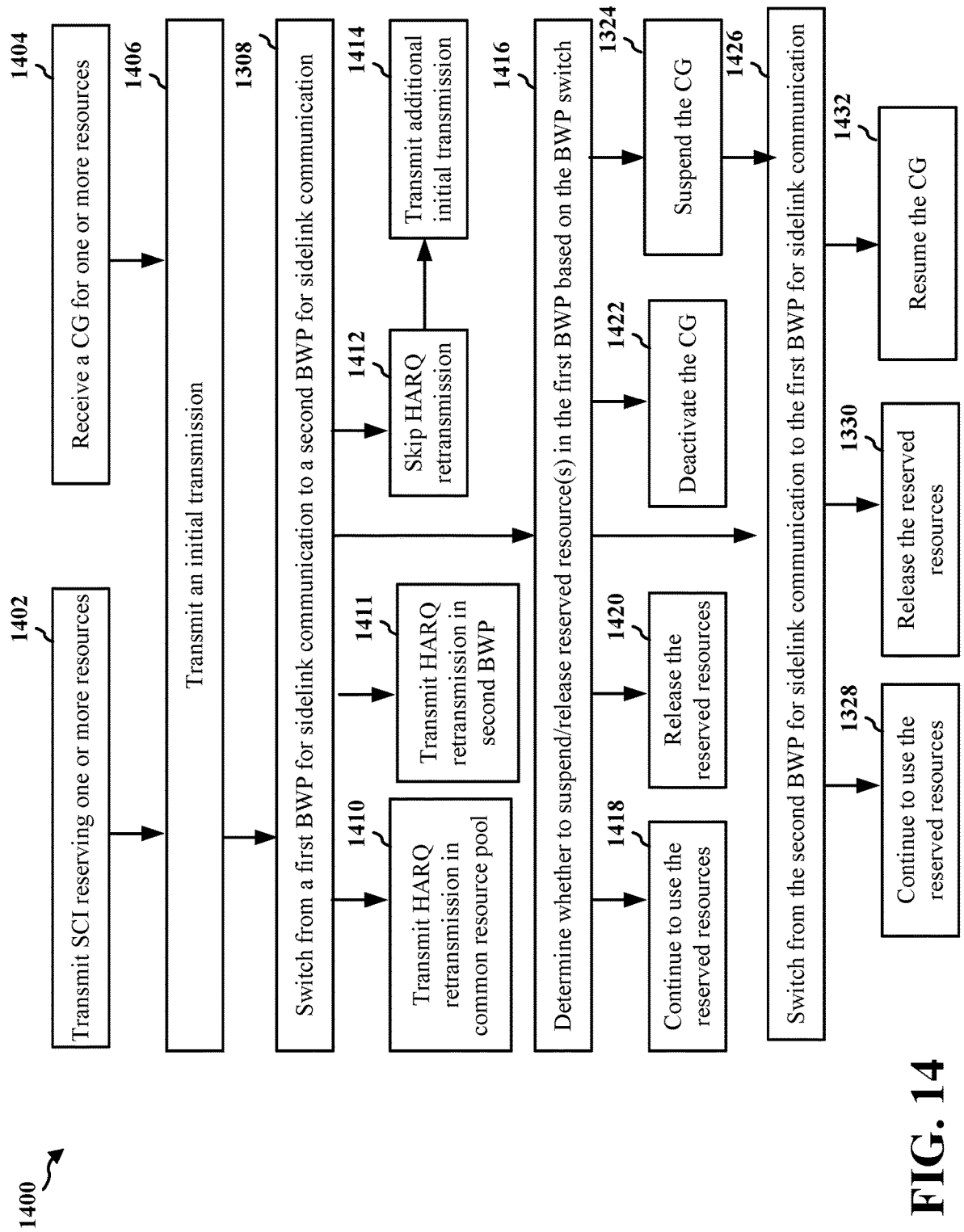
FIG. 14 is a flowchart of a method of wireless communication including sidelink communication with a BWP switch.

FIG. 14 illustrates a flowchart 1400 of a method of wireless communication. The method may include aspects described in connection with FIG. 14. The method may be performed by a sidelink device, such as a UE (e.g., the UE 104, the wireless device 310 or 350, the apparatus 1402). The method may include aspects that have been described in connection with FIG. 13 and are shown with the same reference numbers as in FIG. 13. In response to the switch, at 1308, from the first BWP to the second BWP, at 1416, the sidelink device determines whether to suspend or release one or more reserved resources in the first BWP for the sidelink communication based on a BWP switch from the first BWP to the second BWP for the sidelink communication. As illustrated at 1418, the sidelink device may continue to use the one or more reserved resources in a resource pool of the first BWP based on a switch from the first BWP to the second BWP, e.g., if the resource pool is comprised in the second BWP.

The determination may be performed, e.g., by the sidelink resource component 1542 of the apparatus 1502.

As illustrated at 1402, prior to prior to the BWP switch, the sidelink device may transmit SCI reserving the one or more reserved resources, where the sidelink device determines whether to release the one or more reserved resources. The SCI may indicate a periodic reservation for the one or more reserved resources. The SCI may indicate an aperiodic reservation for the one or more reserved resources. The SCI may be transmitted, e.g., by the reservation component 1544 of the apparatus 1502.

As illustrated at 1420, the sidelink device may release the one or more reserved resources in a resource pool of the first BWP based on a switch from the first BWP to the second BWP, e.g., if the resource pool is not comprised in the second BWP. The release may be performed, e.g., by the sidelink resource component 1542 of the apparatus 1502.

The BWP switch from the first BWP to the second BWP, at 1408 may comprise a first BWP switch. At 1426, the sidelink device may perform a second BWP switch from the second BWP to the first BWP. The switch may be performed, e.g., by the BWP switch component 1540 of the apparatus 1502 in FIG. 15. For example, FIGS. 10 and 11 illustrate examples of a BWP switch.

As illustrated at 1404, the sidelink device may receive prior to the BWP switch, a configured grant reserving the one or more reserved resources for the sidelink device, where the sidelink device determines whether to suspend or deactivate the one or more reserved resources of the configured grant, at 1416, in response to the BWP switch, at 1408. The reception may be performed, e.g., by the reservation component 1544 of the apparatus 1502.

As illustrated at 1426, the sidelink device may switch from the second BWP to the first BWP for the sidelink communication, and at 1432, the sidelink device may resume the sidelink communication based on the configured grant. The resumption may be performed, e.g., by the sidelink resource component 1542 of the apparatus 1502.

As illustrated at 1422, the sidelink device may deactivate the one or more reserved resources in a resource pool of the first BWP based on a switch from the first BWP to the second BWP. In some aspects, the sidelink device may deactivate the reserved resources if the resource pool is not comprised in the second BWP. Additionally, or alternatively, the sidelink device may deactivate the reserved resources if the configured grant is a type 2 configured grant. The deactivation may be performed, e.g., by the sidelink resource component 1542 of the apparatus 1502.

As illustrated at 1406, the sidelink device may transmit an initial transmission of a transport block in the first BWP prior to the BWP switch. The initial transmission may be performed, e.g., by the initial transmission component 1546 of the apparatus 1502.

In some examples, at 1410, the sidelink device may transmit a HARQ retransmission of the transport block in the second BWP after the BWP switch, e.g., if the first BWP and the second BWP share a common resource pool. The initial transmission and the HARQ retransmission may be transmitted in the common resource pool, such as described in connection with the example 1200 in FIG. 12. The retransmission may be performed, e.g., by the retransmission component 1548 of the apparatus 1502.

In some examples, at 1412, the sidelink device may skip a HARQ retransmission of the transport block in the second BWP after the BWP if the second BWP does not include the resource pool in which the initial transmission is transmitted. The skip may be performed, e.g., by the retransmission component 1548 of the apparatus 1502.

As illustrated at 1414, the sidelink device may transmit an additional initial transmission of the transport block in the second BWP in response to negative HARQ feedback for the initial transmission transmitted in the first BWP. The initial transmission may be performed, e.g., by the initial transmission component 1546 of the apparatus 1502.

In some examples, at 1411, the sidelink device may transmit a HARQ retransmission in a second resource pool of the second BWP after the BWP, e.g., if the sidelink communication is based on a centralized resource allocation mode. The retransmission may be performed, e.g., by the retransmission component 1548 of the apparatus 1502.

In some examples, at 1412, the sidelink device may skip a HARQ retransmission in a second resource pool of the second BWP after the BWP, e.g., if the sidelink communication is based on a distributed resource allocation mode. The skip may be performed, e.g., by the retransmission component 1548 of the apparatus 1502.

Figure 15:
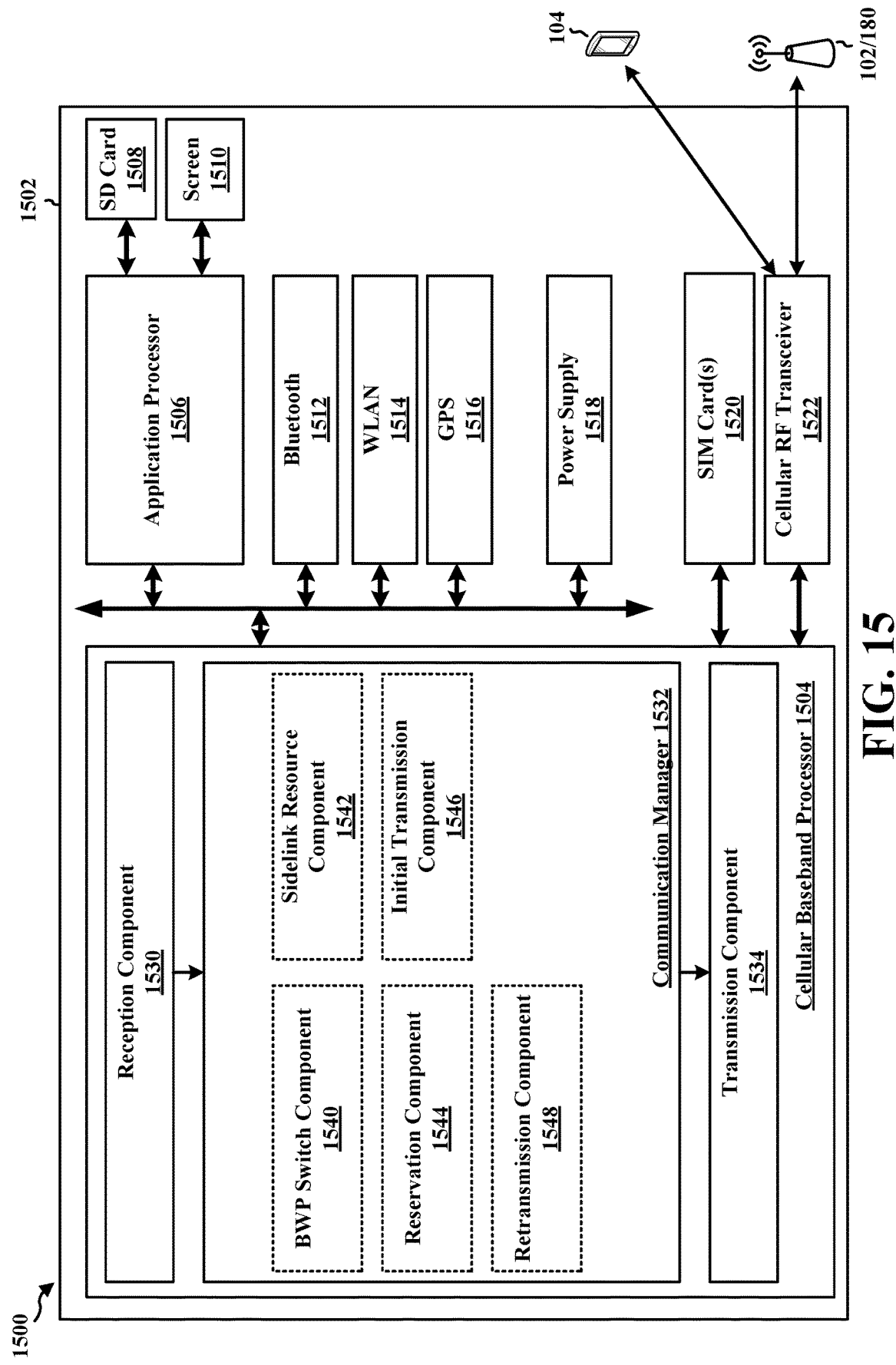
FIG. 15 is a diagram illustrating an example of a hardware implementation for an example apparatus.

FIG. 15 is a diagram 1500 illustrating an example of a hardware implementation for an apparatus 1502. The apparatus 1502 is a device that supports sidelink communication. In some aspects, the apparatus 1502 may be a UE, a component of a UE, may comprise a UE, or may implement UE functionality. In some aspects, the apparatus may further include a baseband processor 1504 (also referred to as a modem). The apparatus 1502 may further include an RF transceiver 1522 coupled to the baseband processor 1504. In some aspects, the apparatus may further include one or more of a subscriber identity module (SIM) card 1520, an application processor 1506 coupled to a secure digital (SD) card 1508 and a screen 1510, a Bluetooth module 1512, a wireless local area network (WLAN) module 1514, a Global Positioning System (GPS) module 1516, and/or a power supply 1518. The baseband processor 1504 communicates through the RF transceiver 1522 with the UE 104 and/or the base station 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described supra. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the device 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire wireless device (e.g., see 350 of FIG. 3) and include the additional modules of the apparatus 1502.

The communication manager 1532 includes a BWP switch component 1540 that is configured to perform a BWP switch between BWPs for sidelink communication, e.g., as described in connection with 1308 or 1426 of FIG. 13. The communication manager 1532 further includes a sidelink resource component 1542 that is configured to determine whether to suspend or release one or more reserved resources in the first BWP for the sidelink communication based on a BWP switch from the first BWP to the second BWP for the sidelink communication, e.g., as described in connection with 1416 in FIG. 14, as well as to apply the determination, such as to suspend, release, or continue using the reserved resources in response to the BWP switch, as described in connection with any of 1418, 1420, 1422, 1324, 1328, 1330, and/or 1432. The communication manager 1532 further includes a reservation component 1544 that is configured to transmit SCI with a reservation or receive a configured grant, e.g., as described in connection with 1402 or 1404 in FIG. 14. The communication manager 1532 further includes an initial transmission component 1546 that is configured to transmit an initial transmission in a resource pool of the first BWP, e.g., as described in connection with 1406 or 1414 in FIG. 14. The communication manager 1532 further includes a retransmission component 1548 that is configured to transmit a retransmission or skip a retransmission, e.g., as described in connection with 1410, 1411, or 1412 in FIG. 14.

The apparatus may include additional components that perform each of the blocks of the algorithm in the aforementioned flowcharts of FIG. 13 or 14. As such, each block in the aforementioned flowcharts of FIG. 13 or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband processor 1504, includes means for switching from a first BWP for sidelink communication to a second BWP for the sidelink communication; and means for determining whether to suspend or release one or more reserved resources in the first BWP for the sidelink communication based on a BWP switch from the first BWP to the second BWP for the sidelink communication. The apparatus 1502 may further include means for continuing to use the one or more reserved resources in a resource pool of the first BWP based on a switch from the first BWP to the second BWP. The apparatus 1502 may further include means for transmitting, prior to the BWP switch, SCI reserving the one or more reserved resources, wherein the sidelink device determines whether to release the one or more reserved resources. The apparatus 1502 may further include means for releasing the one or more reserved resources in a resource pool of the first BWP based on a switch from the first BWP to the second BWP, if the resource pool is not comprised in the second BWP. The apparatus 1502 may further include means for performing a second BWP switch from the second BWP to the first BWP; and means for continuing to use the one or more reserved resources in a resource pool of the first BWP for the sidelink communication. The apparatus 1502 may further include means for performing a second BWP switch from the second BWP to the first BWP; and means for releasing the one or more reserved resources in a resource pool of the first BWP for the sidelink communication if the one or more resources are based on an aperiodic reservation. The apparatus 1502 may further include means for performing a second BWP switch from the second BWP to the first BWP; and means for releasing the one or more reserved resources in a resource pool of the first BWP for the sidelink communication if a transmission occasion of the one or more reserved resources occurs between the first BWP switch and the second BWP switch. The apparatus 1502 may further include means for receiving prior to the BWP switch, a configured grant reserving the one or more reserved resources for the sidelink device, wherein the sidelink device determines whether to suspend or deactivate the one or more reserved resources of the configured grant in response to the BWP switch. The apparatus 1502 may further include means for suspending the one or more reserved resources in a resource pool of the first BWP based on a switch from the first BWP to the second BWP, if the resource pool is not comprised in the second BWP and if the configured grant is a type 1 configured grant.

The apparatus 1502 may further include means for switching from the second BWP to the first BWP for the sidelink communication; and means for resuming the sidelink communication based on the configured grant. The apparatus 1502 may further include means for deactivating the one or more reserved resources in a resource pool of the first BWP based on a switch from the first BWP to the second BWP, if the resource pool is not comprised in the second BWP and if the configured grant is a type 2 configured grant. The apparatus 1502 may further include means for transmitting an initial transmission of a transport block in the first BWP prior to the BWP switch; and means for transmitting a HARQ retransmission of the transport block in the second BWP after the BWP switch if the first BWP and the second BWP share a common resource pool. The apparatus 1502 may further include means for transmitting an initial transmission of a transport block in a resource pool of the first BWP prior to the BWP switch; and means for skipping a HARQ retransmission of the transport block in the second BWP after the BWP if the second BWP does not include the resource pool in which the initial transmission is transmitted. The apparatus 1502 may further include means for transmitting an additional initial transmission of the transport block in the second BWP in response to negative HARQ feedback for the initial transmission transmitted in the first BWP. The apparatus 1502 may further include means for transmitting an initial transmission in a first resource pool of the first BWP prior to the BWP switch; and means for transmitting a HARQ retransmission in a second resource pool of the second BWP after the BWP if the sidelink communication is based on a centralized resource allocation mode. The apparatus 1502 may further include means for transmitting an initial transmission in a first resource pool of the first BWP prior to the BWP switch; and means for skipping a HARQ retransmission in a second resource pool of the second BWP after the BWP if the sidelink communication is based on a distributed resource allocation mode. The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following example aspects are illustrative only and may be combined with aspects of other examples or teachings described herein, without limitation.

Aspect 1 is a method of wireless communication at a sidelink device, comprising: switching from a first BWP for sidelink communication to a second BWP for the sidelink communication; and suspends, releases, or continues to use the one or more reserved resources in the first BWP based on the switching from the first BWP to the second BWP for the sidelink communication.

In aspect 2, the method of aspect 1 further includes that the sidelink device continues to use the one or more reserved resources in a resource pool of the first BWP based on a switch from the first BWP to the second BWP, if the resource pool is comprised in the second BWP.

In aspect 3, the method of aspect 1 or aspect 2 further includes transmitting, prior to the BWP switch, SCI reserving the one or more reserved resources, wherein the sidelink device determines whether to release the one or more reserved resources.

In aspect 4, the method of any of aspects 1 to 3 further includes that the SCI indicates a periodic reservation for the one or more reserved resources.

In aspect 5, the method of any of aspects 1 to 4 further includes that the SCI indicates an aperiodic reservation for the one or more reserved resources.

In aspect 6, the method of any of aspects 1 to 5 further includes releasing the one or more reserved resources in a resource pool of the first BWP based on a switch from the first BWP to the second BWP, if the resource pool is not comprised in the second BWP.

In aspect 7, the method of any of aspects 1 to 6 further includes that the BWP switch from the first BWP to the second BWP comprises a first BWP switch, the method further comprising: performing a second BWP switch from the second BWP to the first BWP; and continuing to use the one or more reserved resources in a resource pool of the first BWP for the sidelink communication.

In aspect 8, the method of any of aspects 1 to 7 further includes that the sidelink device continues to use the one or more reserved resources based on a periodic reservation.

In aspect 9, the method of any of aspects 1 to 8 further includes that the sidelink device continues to use the one or more reserved resources based on the one or more reserved resources not having a transmission occasion between the first BWP switch and the second BWP switch.

In aspect 10, the method of any of aspects 1 to 9 further includes that the sidelink device continues to use the one or more reserved resources based on a priority level of a transmission associated with the one or more reserved resources being above a threshold.

In aspect 11, the method of any of aspects 1 to 10 further includes that the BWP switch from the first BWP to the second BWP comprises a first BWP switch, the method further comprising: performing a second BWP switch from the second BWP to the first BWP; and releasing the one or more reserved resources in a resource pool of the first BWP for the sidelink communication if the one or more resources are based on an aperiodic reservation.

In aspect 12, the method of any of aspects 1 to 11 further includes that the BWP switch from the first BWP to the second BWP comprises a first BWP switch, the method further comprising: performing a second BWP switch from the second BWP to the first BWP; and releasing the one or more reserved resources in a resource pool of the first BWP for the sidelink communication if a transmission occasion of the one or more reserved resources occurs between the first BWP switch and the second BWP switch.

In aspect 13, the method of any of aspects 1 to 12 further includes receiving prior to the BWP switch, a configured grant reserving the one or more reserved resources for the sidelink device, wherein the sidelink device determines whether to suspend or deactivate the one or more reserved resources of the configured grant in response to the BWP switch.

In aspect 14, the method of any of aspects 1 to 13 further includes suspending the one or more reserved resources in a resource pool of the first BWP based on a switch from the first BWP to the second BWP, if the resource pool is not comprised in the second BWP and if the configured grant is a type 1 configured grant.

In aspect 15, the method of any of aspects 1 to 14 further includes switching from the second BWP to the first BWP for the sidelink communication; and resuming the sidelink communication based on the configured grant.

In aspect 16, the method of any of aspects 1 to 15 further includes deactivating the one or more reserved resources in a resource pool of the first BWP based on a switch from the first BWP to the second BWP, if the resource pool is not comprised in the second BWP and if the configured grant is a type 2 configured grant.

In aspect 17, the method of any of aspects 1 to 16 further includes that transmitting an initial transmission of a transport block in the first BWP prior to the BWP switch; and transmitting a HARQ retransmission of the transport block in the second BWP after the BWP switch if the first BWP and the second BWP share a common resource pool.

In aspect 18, the method of any of aspects 1 to 17 further includes that the initial transmission and the HARQ retransmission are transmitted in the common resource pool.

In aspect 19, the method of any of aspects 1 to 18 further includes that transmitting an initial transmission of a transport block in a resource pool of the first BWP prior to the BWP switch; and skipping a HARQ retransmission of the transport block in the second BWP after the BWP if the second BWP does not include the resource pool in which the initial transmission is transmitted.

In aspect 20, the method of any of aspects 1 to 19 further includes that transmitting an additional initial transmission of the transport block in the second BWP in response to negative HARQ feedback for the initial transmission transmitted in the first BWP.

In aspect 21, the method of any of aspects 1 to 20 further includes that transmitting an initial transmission in a first resource pool of the first BWP prior to the BWP switch; and transmitting a HARQ retransmission in a second resource pool of the second BWP after the BWP if the sidelink communication is based on a centralized resource allocation mode.

In aspect 22, the method of any of aspects 1 to 21 further includes that transmitting an initial transmission in a first resource pool of the first BWP prior to the BWP switch; and skipping a HARQ retransmission in a second resource pool of the second BWP after the BWP if the sidelink communication is based on a distributed resource allocation mode.

Aspect 23 is a device including one or more processors and one or more memories in electronic communication with the one or more processors storing instructions executable by the one or more processors to cause the device to implement a method as in any of aspects 1-22.

Aspect 24 is a system or apparatus including means for implementing a method or realizing an apparatus as in any of aspects 1-22.

Aspect 25 is an apparatus for wireless communication comprising memory and at least one processor coupled to the memory, the memory and the at least one processor being configured to perform the method of any of aspects 1-22.

In aspect 26, the apparatus of aspect 25 further includes at least one antenna and a transceiver coupled to the at least one antenna and the at least one processor.

Aspect 27 is an apparatus for wireless communication means to perform the method of any of aspects 1-22.

In aspect 28, the apparatus of aspect 27 further includes at least one antenna and a transceiver coupled to the at least one antenna.

Aspect 29 is a non-transitory computer-readable storage medium storing instructions computer executable code, the code when executed by one or more processors cause the one or more processors to perform a method as in any of aspects 1-22.

Aspect 30 is a method of wireless communication at a sidelink device, comprising: switching from a first BWP for sidelink communication to a second BWP for the sidelink communication; and suspending, releasing, or continuing to use one or more reserved resources in the first BWP based on the switching from the first BWP to the second BWP for the sidelink communication.

In aspect 31, the method of aspect 30 further includes that the sidelink device continues to use the one or more reserved resources in a resource pool of the first BWP based on a switch from the first BWP to the second BWP, if the resource pool is comprised in the second BWP.

In aspect 32, the method of aspect 30 further includes that transmitting, prior to the switching, SCI reserving the one or more reserved resources, wherein the sidelink device releases the one or more reserved resources in response to the switching.

In aspect 33, the method of aspect 32 further includes that the SCI indicates a periodic reservation for the one or more reserved resources or an aperiodic reservation for the one or more reserved resources.

In aspect 34, the method of aspect 30, 32 or 33 further includes that releasing the one or more reserved resources in a resource pool of the first BWP based on a switch from the first BWP to the second BWP.

In aspect 35, the method of aspect 30 further includes that the switching from the first BWP to the second BWP comprises a first BWP switch, the method further comprising: performing a second BWP switch from the second BWP to the first BWP; and continuing to use the one or more reserved resources in a resource pool of the first BWP for the sidelink communication, wherein the sidelink device continues to use the one or more reserved resources based on at least one of: a periodic reservation, the one or more reserved resources not having a transmission occasion between the first BWP switch and the second BWP switch, or a priority level of a transmission associated with the one or more reserved resources being above a threshold.

In aspect 36, the method of aspect 30 further includes that the BWP switch from the first BWP to the second BWP comprises a first BWP switch, the method further comprising: performing a second BWP switch from the second BWP to the first BWP; and releasing the one or more reserved resources in a resource pool of the first BWP for the sidelink communication if the one or more resources are based on an aperiodic reservation.

In aspect 37, the method of aspect 30 further includes that the BWP switch from the first BWP to the second BWP comprises a first BWP switch, the method further comprising: performing a second BWP switch from the second BWP to the first BWP; and releasing the one or more reserved resources in a resource pool of the first BWP for the sidelink communication if a transmission occasion of the one or more reserved resources occurs between the first BWP switch and the second BWP switch.

In aspect 38, the method of aspect 30 further includes receiving, prior to the BWP switch, a configured grant reserving the one or more reserved resources for the sidelink device, wherein the sidelink device determines whether to suspend or deactivate the one or more reserved resources of the configured grant in response to the BWP switch.

In aspect 39, the method of aspect 38 further includes suspending the one or more reserved resources in a resource pool of the first BWP based on a switch from the first BWP to the second BWP, if the configured grant is a type 1 configured grant; switching from the second BWP to the first BWP for the sidelink communication; and resuming the sidelink communication based on the configured grant.

In aspect 40, the method of aspect 30 or aspect 39 further includes deactivating the one or more reserved resources in a resource pool of the first BWP based on a switch from the first BWP to the second BWP if the configured grant is a type 2 configured grant.

In aspect 41, the method of any of aspects 30-39 further include transmitting an initial transmission of a transport block in the first BWP prior to the BWP switch; and transmitting a HARQ retransmission of the transport block in the second BWP after the BWP switch if the first BWP and the second BWP share a common resource pool, wherein the initial transmission and the HARQ retransmission are transmitted in the common resource pool.

In aspect 42, the method of any of aspects 30-39 further include transmitting an initial transmission of a transport block in a resource pool of the first BWP prior to the BWP switch; skipping a HARQ retransmission of the transport block in the second BWP after the BWP switch if the second BWP does not include the resource pool in which the initial transmission is transmitted; and transmitting an additional initial transmission of the transport block in the second BWP in response to negative HARQ feedback for the initial transmission transmitted in the first BWP.

In aspect 43, the method of any of aspects 30-39 further include transmitting an initial transmission in a first resource pool of the first BWP prior to the BWP switch; and transmitting a HARQ retransmission in a second resource pool of the second BWP after the BWP if the sidelink communication is based on a centralized resource allocation mode.

In aspect 44, the method of any of aspects 30-39 further include transmitting an initial transmission in a first resource pool of the first BWP prior to the BWP switch; and skipping a HARQ retransmission in a second resource pool of the second BWP after the BWP if the sidelink communication is based on a distributed resource allocation mode.

Aspect 55 is an apparatus for wireless communication comprising memory and at least one processor coupled to the memory, the memory and the at least one processor being configured to perform the method of any of aspects 30-44.

In aspect 56, the apparatus of aspect 55 further includes at least one antenna and a transceiver coupled to the at least one antenna and the at least one processor.

Aspect 57 is an apparatus for wireless communication means to perform the method of any of aspects 30-44.

In aspect 58, the apparatus of aspect 57 further includes at least one antenna and a transceiver coupled to the at least one antenna.

Aspect 59 is a non-transitory computer-readable storage medium storing instructions computer executable code, the code when executed by one or more processors cause the one or more processors to perform a method as in any of aspects 30-44.

What is claimed is:

1. A method of wireless communication at a sidelink device, comprising:
   transmitting an initial transmission of a transport block in a resource pool of a first bandwidth part (BWP) for sidelink communication prior to switching from the first BWP to a second BWP for the sidelink communication;
   switching from the first BWP for the sidelink communication to the second BWP for the sidelink communication;
   suspending, releasing, or continuing to use one or more reserved resources in the first BWP based on the switching from the first BWP to the second BWP for the sidelink communication; and
   transmitting or skipping a hybrid automatic repeat request (HARQ) retransmission of the transport block in the second BWP after the switching based on at least one of a resource allocation mode, a common resource pool shared by the first BWP and the second BWP, or the resource pool in which the initial transmission is transmitted not being included in the second BWP.

2. The method of claim 1, wherein the sidelink device continues to use the one or more reserved resources in the resource pool of the first BWP based on a switch from the first BWP to the second BWP, if the resource pool is comprised in the second BWP.

3. The method of claim 1, further comprising:
   transmitting, prior to the switching, sidelink control information (SCI) reserving the one or more reserved resources, wherein the sidelink device releases, in response to the switching, the one or more reserved resources that were reserved by the SCI.

4. The method of claim 3, wherein the SCI indicates a periodic reservation for the one or more reserved resources or an aperiodic reservation for the one or more reserved resources.

5. The method of claim 3, further comprising:
   releasing the one or more reserved resources in the resource pool of the first BWP based on a switch from the first BWP to the second BWP.

6. The method of claim 3, wherein the switching from the first BWP to the second BWP comprises a first BWP switch, the method further comprising:
   performing a second BWP switch from the second BWP to the first BWP; and
   continuing to use the one or more reserved resources in the resource pool of the first BWP for the sidelink communication, wherein the sidelink device continues to use the one or more reserved resources based on at least one of:
   a periodic reservation,
   the one or more reserved resources not having a transmission occasion between the first BWP switch and the second BWP switch, or
   a priority level of a transmission associated with the one or more reserved resources being above a threshold.

7. The method of claim 3, wherein the switching from the first BWP to the second BWP comprises a first BWP switch, the method further comprising:
   performing a second BWP switch from the second BWP to the first BWP; and
   releasing the one or more reserved resources in the resource pool of the first BWP for the sidelink communication if the one or more reserved resources are based on an aperiodic reservation.

8. The method of claim 1, further comprising:
receiving, prior to the BWP switch, a configured grant reserving the one or more reserved resources for the sidelink device, wherein the sidelink device determines whether to suspend or deactivate the one or more reserved resources of the configured grant in response to the switching from the first BWP to the second BWP.

9. The method of claim 8, further comprising:
suspending the one or more reserved resources in the resource pool of the first BWP based on a switch from the first BWP to the second BWP if the configured grant is a type 1 configured grant;
switching from the second BWP to the first BWP for the sidelink communication; and
resuming the sidelink communication based on the configured grant.

10. The method of claim 8, further comprising:
deactivating the one or more reserved resources in the resource pool of the first BWP based on a switch from the first BWP to the second BWP if the configured grant is a type 2 configured grant.

11. The method of claim 1, wherein transmitting or skipping the HARQ retransmission of the transport block in the second BWP includes:
transmitting the HARQ retransmission of the transport block in the second BWP after the switching based on the first BWP and the second BWP sharing the common resource pool, wherein the initial transmission and the HARQ retransmission are transmitted in the common resource pool.

12. The method of claim 1, wherein transmitting or skipping the HARQ retransmission of the transport block in the second BWP includes:
skipping the HARQ retransmission of the transport block in the second BWP after the switching based on the second BWP not including the resource pool in which the initial transmission is transmitted; and
transmitting an additional initial transmission of the transport block in the second BWP in response to negative HARQ feedback for the initial transmission transmitted in the first BWP.

13. The method of claim 1, wherein transmitting or skipping the HARQ retransmission of the transport block in the second BWP includes:
transmitting the HARQ retransmission in a second resource pool of the second BWP after the switching based on the sidelink communication being based on a centralized resource allocation mode.

14. The method of claim 1, wherein transmitting or skipping the HARQ retransmission of the transport block in the second BWP includes:
skipping the HARQ retransmission in a second resource pool of the second BWP after the switching based on the sidelink communication being based on a distributed resource allocation mode.

15. A method of wireless communication at a sidelink device, comprising:
transmitting sidelink control information (SCI) reserving one or more reserved resources;
performing a first bandwidth part (BWP) switch from a first BWP for sidelink communication to a second BWP for the sidelink communication;
suspending, releasing, or continuing to use the one or more reserved resources that were reserved by the SCI in the first BWP based on the first BWP switch from the first BWP to the second BWP for the sidelink communication;
performing a second BWP switch from the second BWP to the first BWP; and
releasing the one or more reserved resources in a resource pool of the first BWP for the sidelink communication if a transmission occasion of the one or more reserved resources occurs between the first BWP switch and the second BWP switch.

16. An apparatus for wireless communication at a sidelink device, comprising:
memory; and
at least one processor coupled to the memory and configured to cause the sidelink device to:
transmit an initial transmission of a transport block in a resource pool of a first bandwidth part (BWP) for sidelink communication prior to switching from the first BWP to a second BWP for the sidelink communication;
switch from the first BWP for the sidelink communication to the second BWP for the sidelink communication;
suspend, release, or continue to use one or more reserved resources in the first BWP based on the switch from the first BWP to the second BWP for the sidelink communication; and
transmit or skip a hybrid automatic repeat request (HARQ) retransmission of the transport block in the second BWP after the switch based on at least one of a resource allocation mode, a common resource pool shared by the first BWP and the second BWP, or the resource pool in which the initial transmission is transmitted not being included in the second BWP.

17. The apparatus of claim 16, wherein the at least one processor is configured to cause the sidelink device to continue to use the one or more reserved resources in the resource pool of the first BWP based on the switch from the first BWP to the second BWP based on the resource pool being comprised in the second BWP.

18. The apparatus of claim 16, wherein the at least one processor is further configured to cause the sidelink device to:
transmit, prior to the switch from the first BWP to the second BWP, sidelink control information (SCI) reserving the one or more reserved resources, wherein the one or more reserved resources that are reserved by the SCI are released in response to the switch from the first BWP to the second BWP.

19. The apparatus of claim 18, wherein the SCI indicates a periodic reservation for the one or more reserved resources or an aperiodic reservation for the one or more reserved resources.

20. The apparatus of claim 18, wherein the at least one processor is further configured to cause the sidelink device to:
release the one or more reserved resources in the resource pool of the first BWP based on the switch from the first BWP to the second BWP.

21. The apparatus of claim 18, wherein the switch from the first BWP to the second BWP comprises a first BWP switch, and the at least one processor is further configured to cause the sidelink device to:
perform a second BWP switch from the second BWP to the first BWP; and
continue to use the one or more reserved resources in the resource pool of the first BWP for the sidelink communication, continued use of the one or more reserved resources being based on at least one of:
- a periodic reservation,
- the one or more reserved resources not having a transmission occasion between the first BWP switch and the second BWP switch, or
- a priority level of a transmission associated with the one or more reserved resources being above a threshold.

22. The apparatus of claim 18, wherein the switch from the first BWP to the second BWP comprises a first BWP switch, and wherein the at least one processor is further configured to cause the sidelink device to:
- perform a second BWP switch from the second BWP to the first BWP; and
- release the one or more reserved resources in the resource pool of the first BWP for the sidelink communication if the one or more reserved resources are based on an aperiodic reservation.

23. The apparatus of claim 16, wherein the at least one processor is further configured to cause the sidelink device to:
- receive, prior to the switch from the first BWP to the second BWP, a configured grant reserving the one or more reserved resources for the sidelink device and to suspend or deactivate the one or more reserved resources of the configured grant in response to the switch.

24. The apparatus of claim 23, wherein the at least one processor is further configured to cause the sidelink device to:
- suspend the one or more reserved resources in the resource pool of the first BWP based on the switch from the first BWP to the second BWP if the configured grant is a type 1 configured grant;
- switch from the second BWP to the first BWP for the sidelink communication; and
- resume the sidelink communication based on the configured grant.

25. The apparatus of claim 23, wherein the at least one processor is further configured to cause the sidelink device to:
- deactivate the one or more reserved resources in the resource pool of the first BWP based on the switch from the first BWP to the second BWP if the configured grant is a type 2 configured grant.

26. The apparatus of claim 16, wherein to transmit or skip the HARQ retransmission of the transport block in the second BWP, the at least one processor is further configured to cause the sidelink device to:
- transmit the HARQ retransmission of the transport block in the second BWP after the switching based on the first BWP and the second BWP sharing the common resource pool, wherein the initial transmission and the HARQ retransmission are in the common resource pool.

27. The apparatus of claim 16, wherein to transmit or skip the HARQ retransmission of the transport block in the second BWP, the at least one processor is further configured to cause the sidelink device to:
- skip the HARQ retransmission of the transport block in the second BWP after the switching based on the second BWP not including the resource pool in which the initial transmission is transmitted; and
- transmit an additional initial transmission of the transport block in the second BWP in response to negative HARQ feedback for the initial transmission transmitted in the first BWP.

28. The apparatus of claim 16, wherein to transmit or skip the HARQ retransmission of the transport block in the second BWP, the at least one processor is further configured to cause the sidelink device to:
- transmit the HARQ retransmission in a second resource pool of the second BWP after the switching based on the sidelink communication being based on a centralized resource allocation mode, or
- skip the HARQ retransmission in the second resource pool of the second BWP after the switching based on the sidelink communication being based on a distributed resource allocation mode.

29. The apparatus of claim 16, further comprising:
- at least one antenna; and
- a transceiver coupled to the at least one antenna and the at least one processor.

30. An apparatus for wireless communication at a sidelink device, comprising:
- memory; and
- at least one processor coupled to the memory and configured to cause the sidelink device to:
  - transmit sidelink control information (SCI) reserving one or more reserved resources;
  - perform a first bandwidth part (BWP) switch from a first BWP for sidelink communication to a second BWP for the sidelink communication;
  - suspend, release, or continue to use the one or more reserved resources that were reserved by the SCI in the first BWP based on the first BWP switch from the first BWP to the second BWP for the sidelink communication;
  - perform a second BWP switch from the second BWP to the first BWP; and
  - release the one or more reserved resources in a resource pool of the first BWP for the sidelink communication if a transmission occasion of the one or more reserved resources occurs between the first BWP switch and the second BWP switch.

* * * * *